(12) United States Patent
Chen et al.

(10) Patent No.: US 7,191,047 B2
(45) Date of Patent: Mar. 13, 2007

(54) MOTOR VEHICLE CONTROL USING A DYNAMIC FEEDFORWARD APPROACH

(75) Inventors: Hsien H. Chen, Troy, MI (US); Edward J. Bedner, Brighton, MI (US); Aleksander B. Hac, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 258 days.

(21) Appl. No.: 11/019,145

(22) Filed: Dec. 21, 2004

(65) Prior Publication Data

US 2006/0069489 A1    Mar. 30, 2006

Related U.S. Application Data

(60) Provisional application No. 60/613,543, filed on Sep. 27, 2004.

(51) Int. Cl.
    *G06F 19/00* (2006.01)
(52) U.S. Cl. ............... 701/70; 701/38; 701/42; 701/72; 340/440; 280/5.51
(58) Field of Classification Search .......... 701/36, 701/38, 41, 42, 70–74; 280/5.51; 340/425.5, 340/440
See application file for complete search history.

(56) References Cited

U.S. PATENT DOCUMENTS

| 4,094,479 A | 6/1978 | Kennedy, Jr. |
|---|---|---|
| 4,455,759 A | 6/1984 | Coetsier |
| 4,666,013 A | 5/1987 | Shibahata et al. |
| 4,723,444 A | 2/1988 | Hajek |
| 4,767,588 A | 8/1988 | Ito |
| 4,840,389 A | 6/1989 | Kawabe et al. |
| 4,842,089 A | 6/1989 | Kimbrough et al. |
| 4,961,595 A | 10/1990 | Fukushima et al. |
| 5,040,115 A | 8/1991 | Fukushima et al. |
| 5,228,757 A | 7/1993 | Ito et al. |
| 5,243,524 A | 9/1993 | Ishida et al. |
| 5,448,481 A | 9/1995 | Asanuma et al. |
| 5,480,219 A | 1/1996 | Kost et al. |
| 5,494,345 A | 2/1996 | Inagaki et al. |
| 5,521,820 A | 5/1996 | Wakamatsu et al. |
| 5,579,245 A | 11/1996 | Kato |
| 5,606,502 A | 2/1997 | Adachi et al. |
| 5,684,700 A | 11/1997 | Crocker |
| 5,710,705 A | 1/1998 | Eckert |
| 5,711,023 A | 1/1998 | Eckert et al. |
| 5,747,683 A | 5/1998 | Gerum et al. |
| 5,762,157 A | 6/1998 | Uehara |
| 5,825,284 A | 10/1998 | Dunwoody et al. |
| 5,859,774 A | 1/1999 | Kuzuya et al. |
| 5,869,943 A | 2/1999 | Nakashima et al. |

(Continued)

FOREIGN PATENT DOCUMENTS

DE    19708159    9/1998

(Continued)

*Primary Examiner*—Y. Beaulieu
(74) *Attorney, Agent, or Firm*—Scott A. McBain

(57) ABSTRACT

A control system manages yaw-plane motion, while simultaneously comprehending and managing roll motion. The system reduces excessive maneuver-induced roll motion by properly shaping yaw-plane motion, which may include increasing yaw damping and/or decreasing a yaw gain, under various conditions, to avoid excessive excitation of roll dynamics.

21 Claims, 20 Drawing Sheets

U.S. PATENT DOCUMENTS

| | | |
|---|---|---|
| 5,899,952 A | 5/1999 | Fukada |
| 5,955,714 A | 9/1999 | Reneau |
| 6,002,974 A | 12/1999 | Schiffmann |
| 6,002,975 A | 12/1999 | Schiffmann et al. |
| 6,038,495 A | 3/2000 | Schiffmann |
| 6,055,472 A | 4/2000 | Breunig et al. |
| 6,056,371 A | 5/2000 | Lin et al. |
| 6,059,067 A | 5/2000 | Shibahata et al. |
| 6,065,558 A | 5/2000 | Wielenga |
| 6,070,952 A | 6/2000 | Tozu et al. |
| 6,081,761 A | 6/2000 | Harada et al. |
| 6,128,076 A | 10/2000 | Sackett |
| 6,128,569 A | 10/2000 | Fukushima |
| 6,161,905 A | 12/2000 | Hac et al. |
| 6,176,555 B1 | 1/2001 | Semsey |
| 6,178,368 B1 | 1/2001 | Otake |
| 6,179,394 B1 | 1/2001 | Browalski et al. |
| 6,192,305 B1 | 2/2001 | Schiffmann |
| 6,202,488 B1 | 3/2001 | Cash |
| 6,216,536 B1 | 4/2001 | Manseth |
| 6,223,116 B1 | 4/2001 | Kin et al. |
| 6,225,894 B1 | 5/2001 | Kyrtsos |
| 6,226,587 B1 | 5/2001 | Tachihata et al. |
| 6,233,513 B1 | 5/2001 | Furukawa et al. |
| 6,253,123 B1 | 6/2001 | Scrhamm et al. |
| 6,263,261 B1 | 7/2001 | Brown et al. |
| 6,282,474 B1 | 8/2001 | Chou et al. |
| 6,292,759 B1 | 9/2001 | Schiffmann |
| 6,301,536 B1 | 10/2001 | Vaessen et al. |
| 6,304,805 B1 | 10/2001 | Onogi |
| 6,315,373 B1 | 11/2001 | Yamada et al. |
| 6,324,446 B1 | 11/2001 | Brown et al. |
| 6,324,447 B1 | 11/2001 | Schramm et al. |
| 6,332,104 B1 | 12/2001 | Brown et al. |
| 6,338,012 B2 | 1/2002 | Brown et al. |
| 6,349,247 B1 | 2/2002 | Schramm et al. |
| 6,363,309 B1 | 3/2002 | Irie et al. |
| 6,415,215 B1 | 7/2002 | Nishizaki et al. |
| 6,424,907 B1 | 7/2002 | Rieth et al. |
| 6,428,118 B1 | 8/2002 | Blosch |
| 6,438,464 B1 | 8/2002 | Woywod et al. |
| 6,453,226 B1 * | 9/2002 | Hac et al. ..................... 701/48 |
| 6,496,758 B2 | 12/2002 | Rhode et al. |
| 6,502,014 B1 | 12/2002 | Herrmann et al. |
| 6,502,023 B1 | 12/2002 | Fukada |
| 6,505,108 B2 | 1/2003 | Bodie et al. |
| 6,529,803 B2 | 3/2003 | Meyers et al. |
| 6,542,073 B2 | 4/2003 | Yeh et al. |
| 6,542,792 B2 | 4/2003 | Schubert et al. |
| 6,546,324 B1 | 4/2003 | Chen et al. |
| 6,553,293 B1 | 4/2003 | Hac |
| 6,556,908 B1 | 4/2003 | Lu et al. |
| 6,560,519 B2 | 5/2003 | Williams et al. |
| 6,567,731 B2 | 5/2003 | Chandy |
| 6,584,388 B2 | 6/2003 | Schubert et al. |
| 6,593,849 B2 | 7/2003 | Chubb et al. |
| 6,600,414 B2 | 7/2003 | Foo et al. |
| 6,604,035 B1 | 8/2003 | Wetzel et al. |
| 6,618,656 B2 | 9/2003 | Kueblbeck et al. |
| 6,622,073 B2 | 9/2003 | Tanaka et al. |
| 6,631,317 B2 | 10/2003 | Lu et al. |
| 6,654,671 B2 | 11/2003 | Schubert |
| 6,654,674 B2 | 11/2003 | Lu et al. |
| 6,662,898 B1 | 12/2003 | Mattson et al. |
| 6,671,595 B2 | 12/2003 | Lu et al. |
| 6,672,689 B1 | 1/2004 | Bauer |
| 6,678,631 B2 | 1/2004 | Schiffmann |
| 6,681,167 B2 | 1/2004 | Bender et al. |
| 6,687,576 B2 | 2/2004 | Mattes et al. |
| 6,691,549 B2 | 2/2004 | Froeschl et al. |
| 6,697,726 B2 | 2/2004 | Takagi et al. |
| 6,701,276 B2 | 3/2004 | Kueblbeck et al. |
| 6,704,622 B2 | 3/2004 | Tinskey et al. |
| 6,711,482 B2 | 3/2004 | Shiino et al. |
| 6,714,851 B2 | 3/2004 | Hrovat et al. |
| 6,718,248 B2 | 4/2004 | Lu et al. |
| 6,719,087 B2 | 4/2004 | Demerly |
| 6,725,135 B2 | 4/2004 | McKeown et al. |
| 6,735,510 B2 | 5/2004 | Hac |
| 6,741,922 B2 | 5/2004 | Holler |
| 6,755,274 B2 | 6/2004 | Mattes et al. |
| 6,757,595 B1 | 6/2004 | Bauer |
| 6,782,315 B2 | 8/2004 | Lu et al. |
| 6,796,397 B2 | 9/2004 | Lahmann et al. |
| 6,799,092 B2 | 9/2004 | Lu et al. |
| 6,804,584 B2 | 10/2004 | Tseng et al. |
| 6,804,594 B1 | 10/2004 | Chen et al. |
| 6,830,122 B2 | 12/2004 | Kroppe |
| 2001/0003805 A1 | 6/2001 | Koibuchi |
| 2002/0059023 A1 | 5/2002 | Takagi et al. |
| 2002/116105 A1 | 8/2002 | Chen et al. |
| 2002/0147532 A1 | 10/2002 | Inagaki et al. |
| 2002/0183911 A1 | 12/2002 | Tashiro et al. |
| 2003/0055547 A1 | 3/2003 | Chen et al. |
| 2003/0055549 A1 | 3/2003 | Barta et al. |
| 2003/0078700 A1 | 4/2003 | Chee |
| 2003/0093201 A1 | 5/2003 | Schubert et al. |
| 2003/0163231 A1 | 8/2003 | Meyers et al. |
| 2003/0195679 A1 | 10/2003 | McKeown et al. |
| 2003/0195684 A1 | 10/2003 | Martens |
| 2003/0212482 A1 | 11/2003 | Lu et al. |
| 2003/0221899 A1 | 12/2003 | Bender et al. |
| 2004/0019418 A1 | 1/2004 | Lu et al. |
| 2004/0024504 A1 | 2/2004 | Salib et al. |
| 2004/0024505 A1 | 2/2004 | Salib et al. |
| 2004/0024509 A1 | 2/2004 | Salib et al. |
| 2004/0030475 A1 | 2/2004 | Lu et al. |
| 2004/0030479 A1 | 2/2004 | Arndt et al. |
| 2004/0030481 A1 | 2/2004 | Salib et al. |
| 2004/0041358 A1 | 3/2004 | Hrovat et al. |
| 2004/0046447 A1 | 3/2004 | Wanke et al. |
| 2004/0060765 A1 | 4/2004 | Mattson et al. |
| 2004/0064236 A1 | 4/2004 | Lu et al. |
| 2004/0064237 A1 | 4/2004 | Lu et al. |
| 2004/0068358 A1 | 4/2004 | Walenty et al. |
| 2004/0070268 A1 | 4/2004 | Baumgarten |
| 2004/0074693 A1 | 4/2004 | Mattson et al. |
| 2004/0078131 A1 | 4/2004 | Faye et al. |
| 2004/0102886 A1 | 5/2004 | Lin et al. |
| 2004/0102887 A1 | 5/2004 | Lin et al. |
| 2004/0102894 A1 | 5/2004 | Holler |
| 2004/0111208 A1 | 6/2004 | Meyers et al. |
| 2004/0117085 A1 | 6/2004 | Lu et al. |
| 2004/0128044 A1 | 7/2004 | Hac |
| 2004/0128060 A1 | 7/2004 | Park |
| 2004/0133321 A1 | 7/2004 | Ghoneim et al. |
| 2004/0148077 A1 | 7/2004 | Yasui et al. |
| 2004/0148080 A1 | 7/2004 | Ekmark et al. |
| 2004/0162644 A1 | 8/2004 | Torii et al. |
| 2004/0162654 A1 | 8/2004 | Lu et al. |
| 2004/0167692 A1 | 8/2004 | Lu et al. |
| 2004/0167701 A1 | 8/2004 | Mattson et al. |
| 2004/0172183 A1 | 9/2004 | Lu et al. |
| 2004/0176889 A1 | 9/2004 | Capito |
| 2004/0176890 A1 | 9/2004 | Acker et al. |
| 2004/0176897 A1 | 9/2004 | Williams |
| 2004/0193352 A1 | 9/2004 | Ito et al. |
| 2004/0199314 A1 | 10/2004 | Meyers et al. |
| 2004/0199316 A1 | 10/2004 | Kato et al. |
| 2004/0199317 A1 | 10/2004 | Ogata et al. |
| 2004/0215384 A1 | 10/2004 | Kummel et al. |

| | | | |
|---|---|---|---|
| 2005/0222728 A1* | 10/2005 | Hac et al. | 701/38 |

FOREIGN PATENT DOCUMENTS

| DE | 19844540 | 3/2000 |
|---|---|---|
| DE | 10135020 | 7/2001 |
| EP | 0788932 | 8/1997 |
| EP | 0883522 | 12/1998 |
| EP | 1285833 | 7/2002 |
| JP | 10173109 | 6/1998 |
| JP | 2001213300 | 8/2001 |
| JP | 2002168620 | 6/2002 |
| JP | 1219500 | 7/2002 |
| JP | 2002274214 | 9/2002 |
| JP | 2002274306 | 9/2002 |
| JP | 2002307996 | 10/2002 |

* cited by examiner

YAW PLANE

ROLL MOTION

MOTOR VEHICLE CONTROL USING A DYNAMIC FEEDFORWARD APPROACH

This application claims the benefit of U.S. Provisional Patent Application Ser. No. 60/613,543, entitled "MOTOR VEHICLE ROLLOVER PREVENTION USING A DYNAMIC FEEDFORWARD APPROACH," by Hsien H. Chen et al., filed Sep. 27, 2004, and which is hereby incorporated herein by reference in its entirety.

CROSS-REFERENCE TO RELATED APPLICATIONS

This application is related to application Ser. No. 11/018,260, entitled FEEDFORWARD CONTROL OF MOTOR VEHICLE ROLL ANGLE, by Aleksander B. Hac et al., filed Dec. 21, 2004.

TECHNICAL FIELD

The present invention is generally directed to motor vehicle control and, more specifically, to motor vehicle control using a dynamic feedforward approach.

BACKGROUND OF THE INVENTION

Various active control systems have been proposed and/or implemented that have controlled the brakes, steering and/or suspension of a motor vehicle to better allow a driver of the motor vehicle to maintain control of the vehicle under varying circumstances and conditions. In general, these control systems have attempted to improve motor vehicle performance in various driving conditions by coordinating control of multiple vehicle subsystems. Typically, such control systems have utilized a reference model, a state estimator and a vehicle control unit, which has incorporated feedback control in conjunction with feedforward control.

Similarly, a number of active control systems have been proposed to reduce the likelihood of motor vehicle rollover. In general, the design of these systems has been based on roll state dynamics. Typically, yaw rate stability control systems have been designed with consideration for yaw-plane motion and have ignored roll motion. Additionally, rollover stability control systems have been designed for roll motion and have ignored yaw-plane motion. In general, brake-based control designers have experienced difficulty in developing a strategy that coordinates rollover and yaw stability.

A number of motor vehicles have included electronic stability control (ESC), which is a closed-loop stability control system that relies on antilock brake system (ABS) and traction control system (TCS) components. A typical ESC system incorporates sensors for determining vehicle states, as well as an electronic control unit (ECU) to modulate braking and traction forces responsive to signals provided by the sensors. Various ESC systems have included wheel speed sensors, a steering wheel angle sensor, yaw rate and lateral acceleration sensors and master cylinder pressure sensors.

In general, the steering wheel angle sensor has provided a steering wheel angle and a steering input rate. The wheel speed sensors have provided signals that the ECU uses to compute the speed of the wheels. Typically, the vehicle speed is derived from the rotational speeds of all wheels using a computational algorithm. The yaw rate sensor has usually been implemented as a gyroscopic sensor that monitors a rotation about a vertical axis of the motor vehicle. The lateral acceleration sensor has been positioned to measure the acceleration of the vehicle in the direction of the lateral axis of the vehicle, i.e., the side-to-side motion of the vehicle. In a typical ESC system, the ECU includes a microprocessor that processes and interprets the information from each of the sensors and then generates necessary activation commands to control brake pressure and engine torque.

The concept behind an ESC system is to provide an active safety system that helps a motor vehicle operator prevent skidding that can occur in various kinds of weather, on different types of roads and in situations where even expert drivers may struggle to maintain their vehicles on the roadway. The stabilizing effect provided by an ESC system is based on calculations performed by the microprocessor of the ECU, which evaluates signals provided from the various sensors. The microprocessor utilizes the information provided by the sensors to continuously compare the actual and desired movement of the vehicle and intervene if the vehicle shows a tendency to leave an intended travel path. The ESC stabilizing effect is achieved by automatically applying a differential brake force (i.e. a difference between the left side and right side longitudinal braking forces), which affects the turning motion of the vehicle and helps to keep it on the intended path.

Typically, a control algorithm implemented by the microprocessor utilizes program setpoints, which are tailored to a particular vehicle and specific operations of the vehicle. The microprocessor of the ESC system then transmits appropriate commands to the braking system, to cause the braking system to provide a defined brake pressure at an appropriate wheel, depending upon the deviation of the motor vehicle from a desired path. The microprocessor may also command the vehicle to reduce engine torque during understeering or when wheel spin is detected during acceleration.

What is needed is an active control system that manages yaw-plane motion, while also comprehending and managing roll motion. It would also be desirable if the control system was capable of providing handling enhancements for an electronic stability control system implementing brake-based control.

SUMMARY OF THE INVENTION

According to one embodiment of the present invention, a dynamic feedforward (DFF) electronic stability control (ESC) system for a motor vehicle includes at least one sensor, a control unit and an ESC actuator. The at least one sensor provides a driver input. The control unit implements a dynamic reference model algorithm that receives the driver input and provides a desired behavior. The control unit also implements a feedforward control algorithm that receives the desired behavior as an input and determines an ESC differential force target in response thereto. The control unit converts the ESC differential force target into longitudinal wheel slip targets or equivalently a "delta velocity (DVLR) command," which is provided to the ESC actuator. The ESC actuator controls a vehicle subsystem responsive to the DVLR command to provide a desired motion correction to the motor vehicle.

According to another aspect of the present invention, the driver input includes a steering angle and a vehicle speed. According to a different aspect of the present invention, the reference model algorithm models one of a motor vehicle yaw rate and a motor vehicle roll angle.

According to another embodiment of the present invention, a control system for a motor vehicle that coordinates yaw-plane motion and roll motion of the motor vehicle includes at least one sensor, a control unit and an electronic stability control (ESC) actuator. The at least one sensor provides a plurality of driver inputs that include a steering angle and a motor vehicle speed. The control unit implements a reference model algorithm that receives the plurality of driver inputs and provides a desired yaw rate. The control unit also implements a roll motion prediction model algorithm that predicts when roll motion of the vehicle may be severely excited by yaw-plane motion. The control unit modifies the desired yaw rate when roll motion excitation exceeds a desired level. The control unit implements a plant model algorithm that provides a predicted yaw rate based upon the steering angle and rate. The control unit determines an error term, based upon the desired yaw rate and the predicted yaw rate, and provides a delta velocity (DVLR) command to the ESC actuator to manage roll motion excitation by providing a desired correction to the motor vehicle.

According to yet another embodiment of the present invention, a control system for a motor vehicle that coordinates yaw-plane motion and roll motion of the motor vehicle includes at least one sensor, a control unit and an electronic stability control (ESC) actuator. The at least one sensor provides a plurality of driver inputs that include a steering angle, a motor vehicle speed and an actual yaw rate. The control unit implements a reference model algorithm that receives the plurality of driver inputs and provides a desired yaw rate. The control unit also implements a roll motion prediction model algorithm that predicts when roll motion of the vehicle may be severely excited by yaw-plane motion. The control unit determines an error term, based upon the desired yaw rate and the actual yaw rate, and provides a delta velocity (DVLR) command to the ESC actuator to manage roll motion excitation by providing a desired correction to an associated motor vehicle.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

According to one aspect of the present invention, a motor vehicle control algorithm is employed that uses a single-point tuning approach by computing a feedforward control term as a function of desired reference model behavior. The desired reference model utilizes steering angle, vehicle speed and roll motion dynamics and may model a motor vehicle yaw rate or a motor vehicle roll angle.

Figure 1:
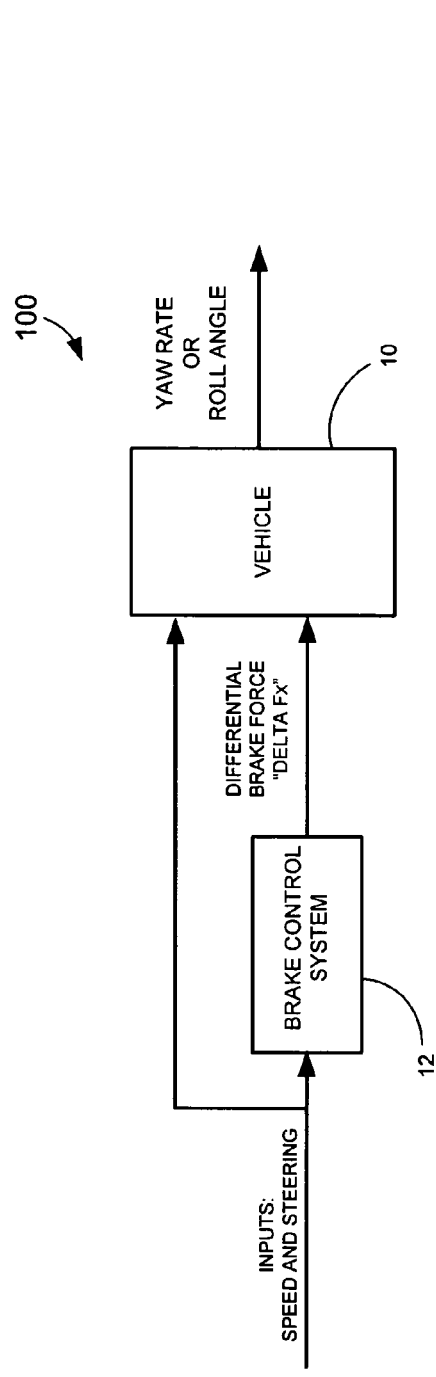
FIG. 1 depicts a block diagram representing the physical relationship of a steering input, a brake control system and their influence on a motor vehicle's motion.

With reference to FIG. 1, a system 100, which implements feedforward control of motor vehicle 10 handling dynamics, is depicted. As is shown, the vehicle outputs are vehicle handling motion variables, such as yaw rate or roll angle. The vehicle 10 responds to two inputs, i.e., a steering input and a differential brake force input. The differential brake force is automatically generated by a brake control system 12 that includes a feedforward control. The differential brake force is specifically a difference in brake force on the left side and right side of the vehicle 10, intended to affect the rotation of the vehicle.

Figure 2:
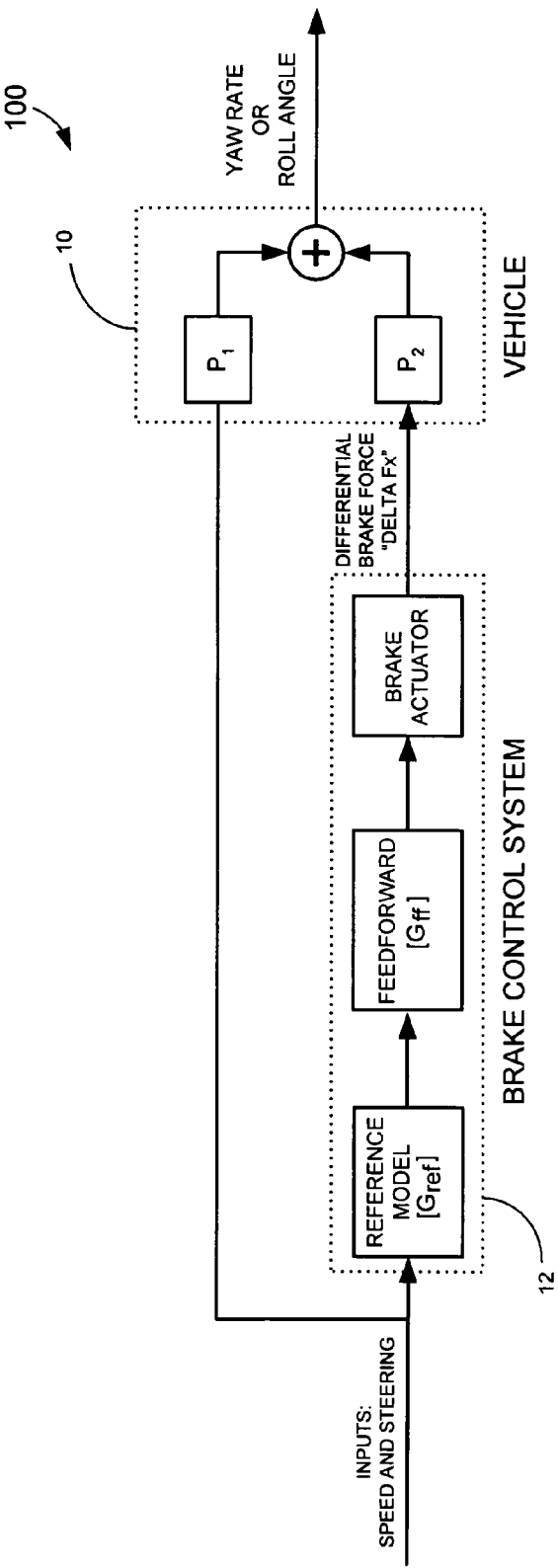
FIG. 2 depicts further details of the structure of FIG. 1.

With reference to FIG. 2, further details of the system 100 are shown. $G_{ref}$ is a reference model transfer function that relates a steering angle $\delta_F$ to a desired vehicle motion signal $\Phi_{desired}$. $G_{ref}$ represents the desired vehicle motion, which is different in some aspects than the natural motion. For example $G_{ref}$ may have higher damping and/or lower static gain of the yaw or roll modes, and it may be dependent on vehicle speed. $G_{ff}$ is a feedforward control transfer function that relates the desired motion signal to a differential brake force command. $P_1$ is a transfer function that relates steering input to a vehicle motion output $\Phi$ (yaw rate or roll angle). $P_1$ represents the natural response of vehicle to driver (steering) input, without any control intervention. $P_2$ is the transfer function that relates differential brake force input to a vehicle motion output $\Phi$ (yaw rate or roll angle). Both $P_1$ and $P_2$ are known to be dependent on vehicle speed.

Transfer functions $G_{ref}$ and $G_{ff}$ are intended to be implemented as discrete-time equations that are calculated by a microprocessor within an electronic control unit (ECU) of the brake system. The transfer functions $P_1$ and $P_2$ mathematically represent the physic principles that govern the vehicle motion with respect to steering and braking force inputs.

Using the system 100 structure as shown in FIG. 2, the transfer functions $G_{ref}$ and $G_{ff}$ are determined in the following way. First, the desired vehicle motion response is chosen, based on performance criteria, and this is then used to establish the desired parameters for the $G_{ref}$ reference model transfer function, such as desired gain, desired damping, desired natural frequency, and others. This relationship can be described as:

$$\Phi_{desired} = G_{ref} \cdot \delta_F \quad (1)$$

The feedforward control transfer function $G_{ff}$ can then be determined as shown by the following derivation, starting with the equation that represents the system of FIG. 2:

$$\Phi = P_1 \cdot \delta_F + P_2 \cdot G_{ff} \cdot G_{ref} \cdot \delta_F \quad (2)$$

As the actual motion response should be equal to the desired motion response, the two equations are set equal, as is set forth below:

$$\Phi_{desired} = \Phi \quad (3)$$

Substituting equations 1 and 2 into equation 3 yields:

$$G_{ref} \cdot \delta_F = P_1 \cdot \delta_F + P_2 \cdot G_{ff} \cdot G_{ref} \cdot \delta_F \quad (4)$$

which can then be solved for the feedforward control transfer function, giving:

$$G_{ff} = P_2^{-1} \cdot (1 - P_1 \cdot G_{ref}^{-1}) \quad (5)$$

It is known that several transfer function parameters in $P_1$ and $P_2$ are dependent on vehicle speed. It is also expected that the desired transfer function $G_{ref}$ will intentionally change with vehicle speed based on performance requirements. Thus, it is expected that the feedforward control $G_{ff}$ will also change with vehicle speed.

For practical implementation of the control described above, there are two items that may be considered. First, due to the intrusive nature of a brake-based control, it is frequently desirable to implement a deadband to prevent unwanted activations of the vehicle brake subsystem. A deadband can be implemented on the output of the feedforward control calculation so as to prevent brake activations when the control output magnitude is below a specified threshold. Secondly, it is recognized that the inverse of some transfer functions may not be directly implementable. This problem is avoided by the fact that each individual transfer function inversion does not need to be implemented alone, but instead only the overall control transfer function, i.e., $G_{ff}*G_{ref}$, needs to be implemented. Based on the above description, it should be appreciated that the system of FIG. 2 will provide a desirable response. The brake system controller output (i.e., the differential brake force command) is calculated during each execution of the control algorithm by passing the measured steering angle signal through a set of equations that represent the speed-dependent transfer functions for $G_{ref}$ and $G_{ff}$. The differential brake force, derived from the feedforward controller, will then shape the dynamic vehicle motion to achieve the desired response.

Figure 3:
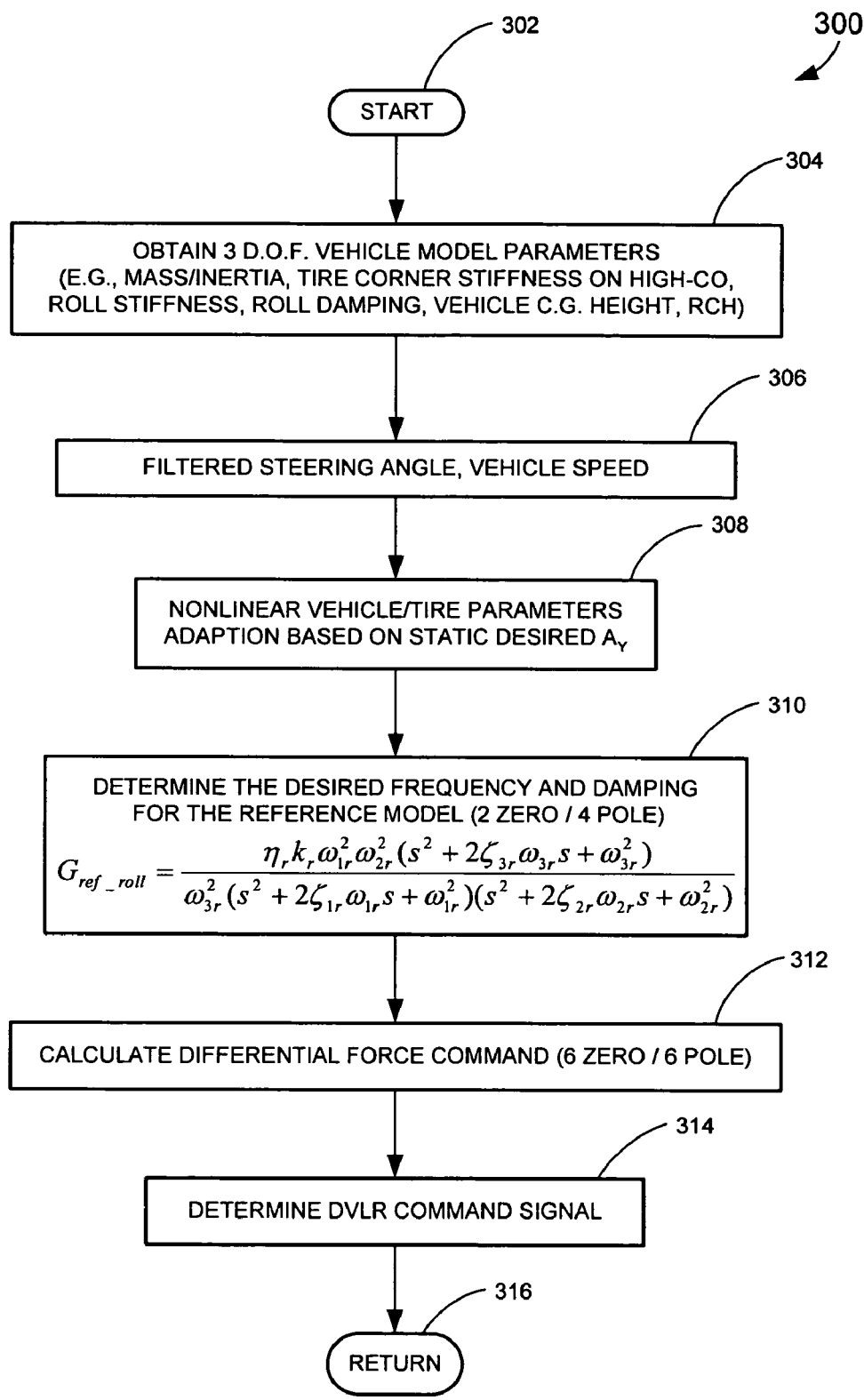
FIG. 3 depicts an exemplary dynamic feedforward (DFF) control routine for a full order ESC system that operates on a desired roll angle.

FIG. 3 sets forth an exemplary DFF control routine 300 for a full order ESC system that operates on a desired roll angle reference model. In step 302, the routine 300 is initiated, at which point control transfers to step 304, where the microprocessor obtains three degree-of-freedom (DOF) vehicle model parameters, such as mass/inertia, tire corner stiffness on a high coefficient of friction surface (high-co), roll stiffness, roll damping, vehicle center of gravity height and roll center height (RCH). Next, in step 306, a filtered steering wheel position and vehicle speed are determined. Then, in step 308, a nonlinear vehicle/tire parameter adaptation is performed (e.g., tire cornering stiffness may change as a function of a static desired lateral acceleration $A_y$), based on the lateral acceleration $A_y$, e.g., calculated from steering angle and speed. Next, in step 310, a desired frequency and damping for a reference model that includes a transfer function having two zeroes and four poles is determined. Then, in step 312, a desired differential brake force is calculated for a transfer function that includes six zeroes and six poles. Next, in step 314, the desired differential brake force is converted to a DVLR command signal, at which point control transfers to step 316, where the routine 300 returns to a calling routine. The calling routine then passes the DVLR command signal to an actuator control algorithm which generates brake force commands based on the DVLR command signal.

Figure 4A:
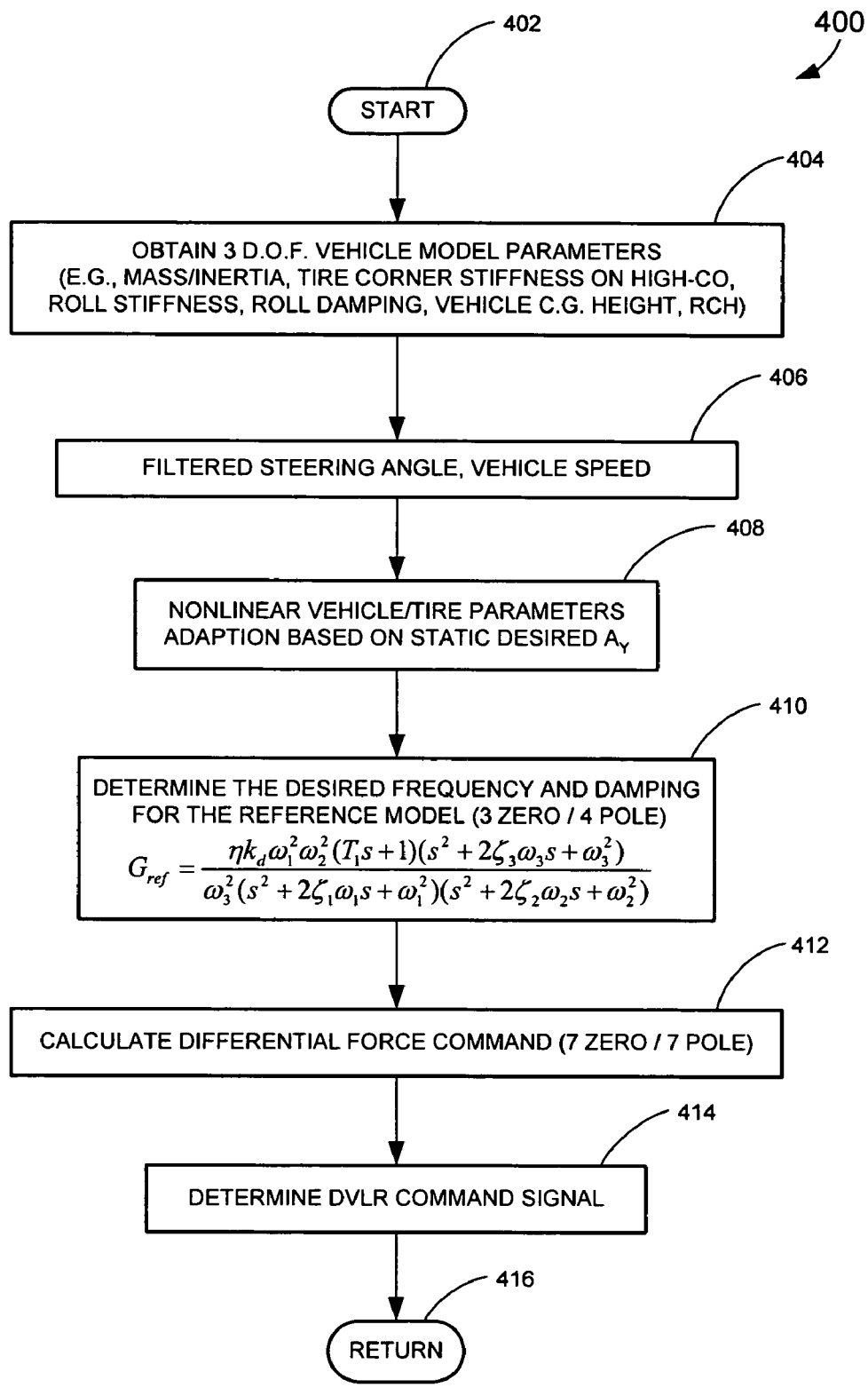
FIG. 4A depicts a DFF control routine for a full order ESC system that operates on a desired yaw rate.

With reference to FIG. 4A, a DFF control routine 400 for a full order ESC system utilizing a desired yaw rate reference model is depicted. In step 402, the routine 400 is initiated, at which point control transfers to step 404, where three DOF vehicle model parameters are obtained. Next, in step 406, a filtered steering wheel position and vehicle speed are obtained. Then, in step 408, nonlinear vehicle/tire parameter adaptations, based on a static desired lateral acceleration Ay, are initiated. Next, in step 410, a desired frequency and damping for a reference model having a transfer function with three zeroes and four poles are determined. Then, in step 412, a differential brake force is calculated for a transfer function having seven zeroes and seven poles. Next, in step 414, an appropriate DVLR command signal is determined for the differential brake force, at which point control transfers to step 416, where the routine returns to a calling routine.

Figure 4B:
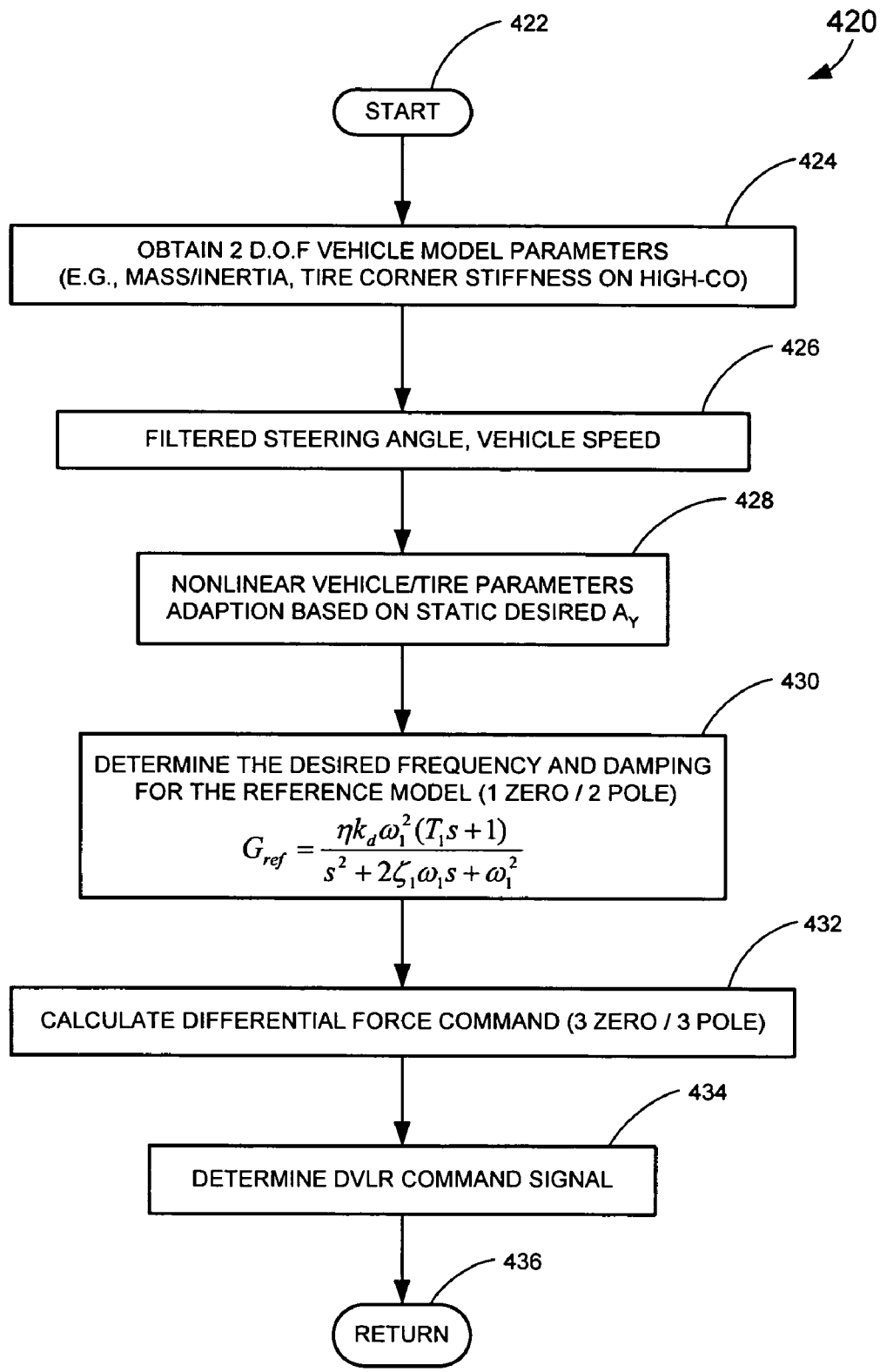
FIG. 4B depicts a DFF control routine for a reduced order ESC system that operates on a desired yaw rate.

With reference to FIG. 4B, a DFF control routine 420 for a reduced order ESC system utilizing a desired yaw rate reference model is depicted. In step 422, the routine 420 is initiated, at which point control transfers to step 424, where two DOF vehicle model parameters are obtained. Next, in step 426, a filtered steering wheel position and a vehicle speed are obtained. Then, in step 428, nonlinear vehicle/tire parameter adaptations, based on a static desired lateral acceleration Ay, are performed. Next, in step 430, a desired frequency and damping for a reference model-that includes a transfer function having one zero and two poles is determined. Then, in step 432, the differential brake force for a transfer function having three zeroes and three poles is calculated. Next, in step 434, an appropriate DVLR command signal is determined from the differential brake force, at which point control transfers to step 436, where the routine 420 returns to a calling routine.

FIGS. 5A–5D depict graphs of simulation results for a motor vehicle, during a National Highway Traffic Safety Administration (NHTSA) fish-hook maneuver on a dry surface, that illustrate motor vehicle control implemented in an ESC system with DFF control (according to FIGS. 4A–4B) and for a base ESC system, for a desired yaw rate reference model. According to one embodiment, ESC based motor vehicle control is activated if the absolute value of the DVLR signal exceeds a preset threshold. The threshold may be a function of speed, e.g., greater than 20 KPH, and brake actuation is in the same direction as the DVLR signal. That is, a positive DVLR signal indicates a need to generate a clockwise yaw moment, which is achieved by applying one or two brakes on the right side of the vehicle. Conversely, a negative DVLR signal indicates a need to generate a counterclockwise yaw moment, which is achieved by applying one or two brakes on the left side of the vehicle.

Figure 5A:
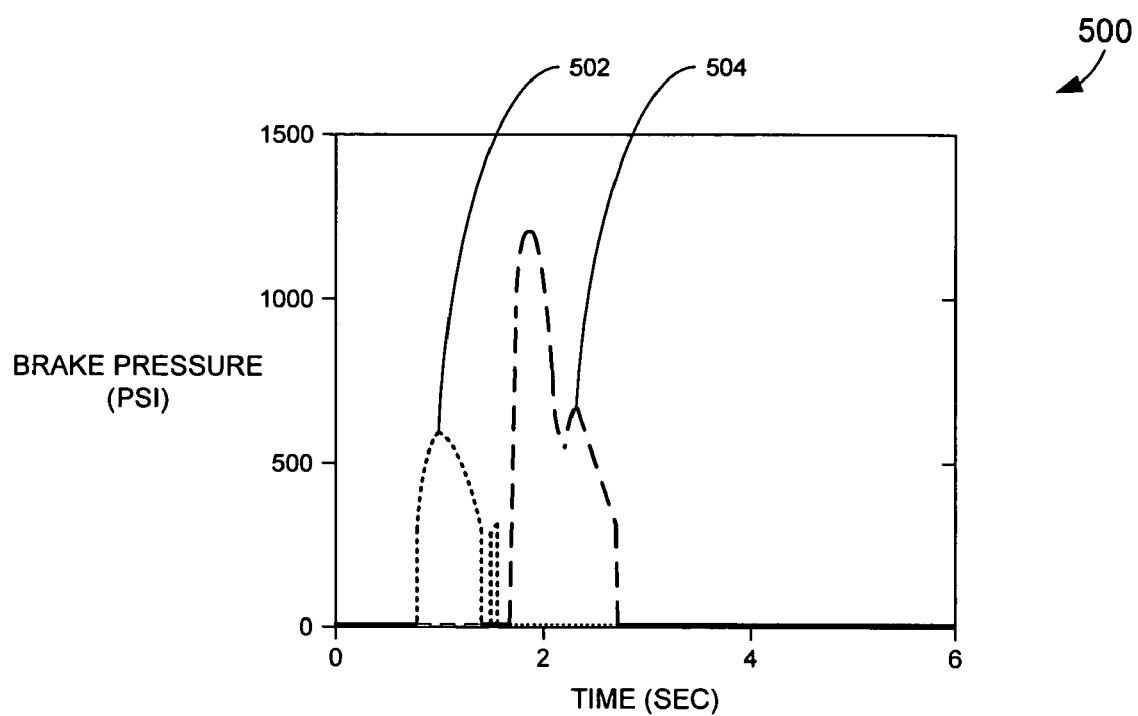
FIG. 5A is a graph that includes curves that illustrate a brake pressure over time for an ESC system with DFF control, according to FIG. 3, and a base ESC system.
Figure 5B:
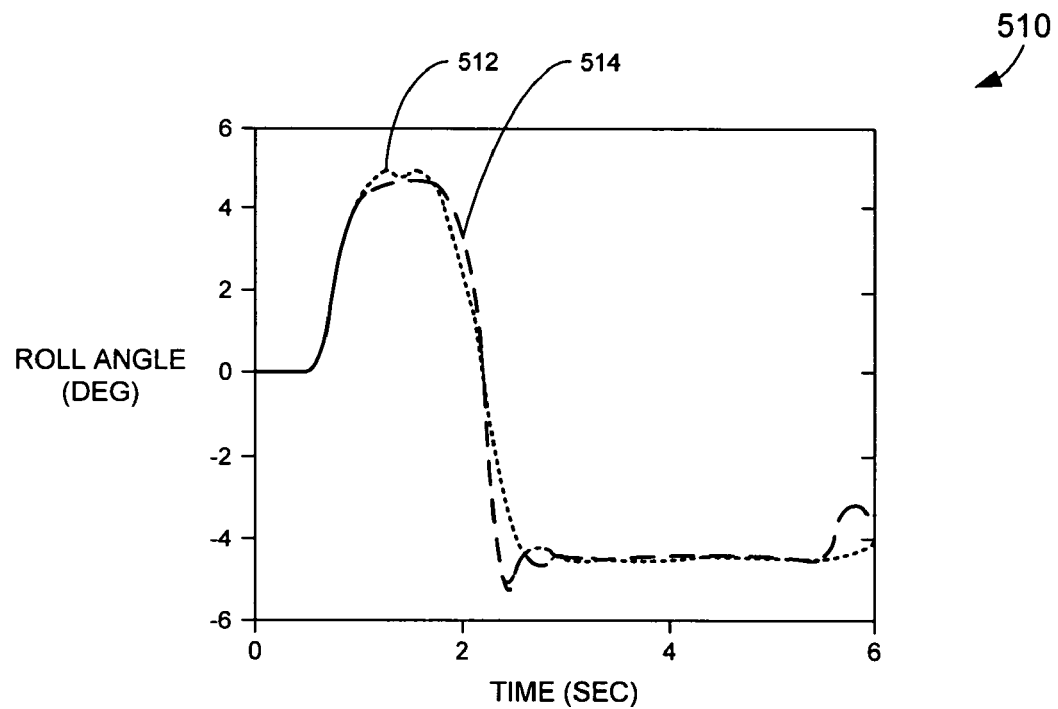
FIG. 5B is a graph that includes curves that depict a roll angle as a function of time for an ESC system with DFF control, according to FIG. 3, and a base ESC system.
Figure 5C:
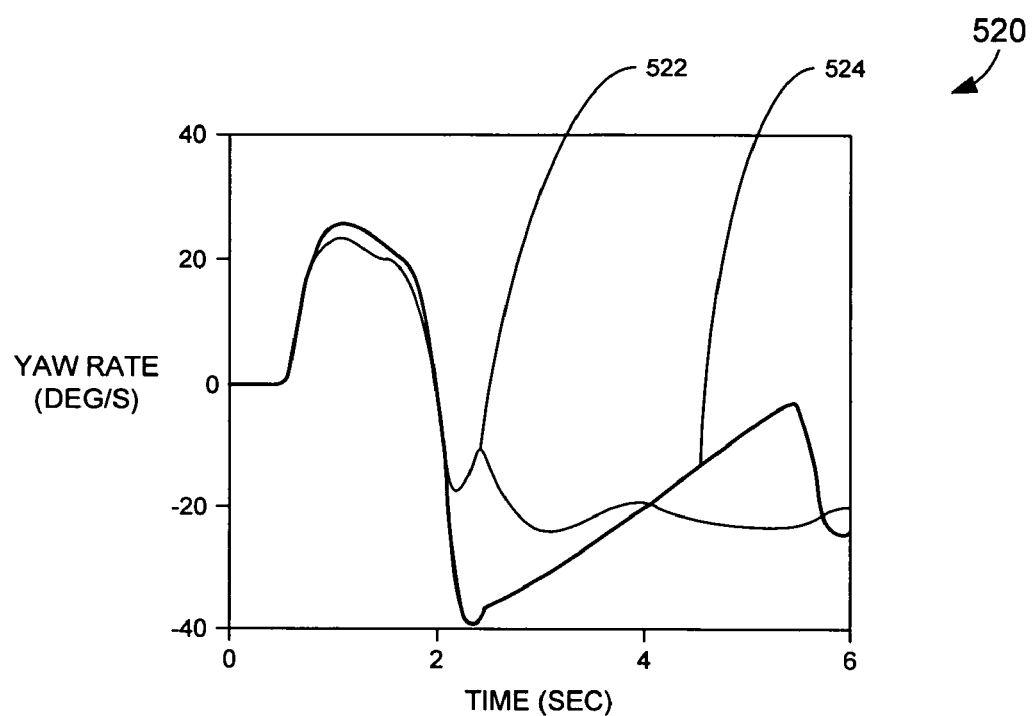
FIG. 5C is a graph that includes curves that depict a yaw rate as a function of time for an ESC system with DFF control, according to FIG. 3, and a base ESC system.
Figure 5D:
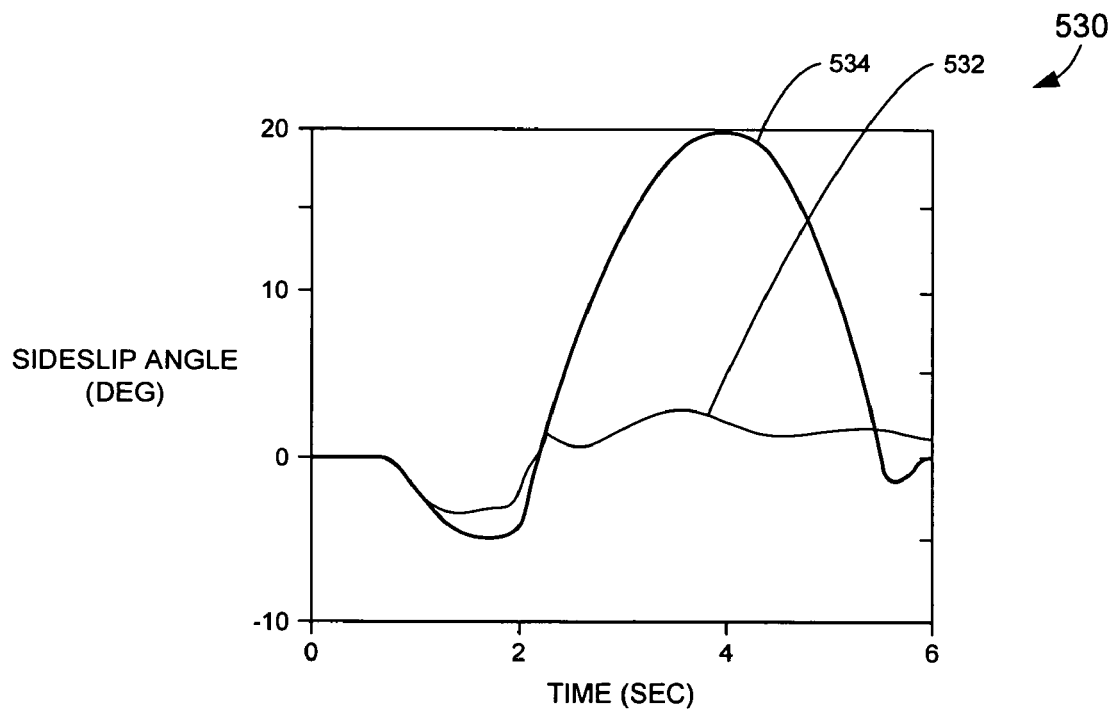
FIG. 5D is a graph showing curves that show a tire sideslip angle as a function of time for an ESC system with DFF control, according to FIG. 3, and a base ESC system.

The graph 500 of FIG. 5A depicts curves 502 and 504, which illustrate the brake pressure over time for an ESC system with DFF control and a base ESC system, respectively. With reference to FIG. 5B, a graph 510 includes curves 512 and 514, which depict the roll angle as a function of time for an ESC system with DFF control and a base ESC system, respectively. FIG. 5C depicts a graph 520 having curves 522 and 524, which depict a yaw rate as a function of time for an ESC system with DFF control and a base ESC system, respectively. FIG. 5D depicts a graph 530 including curves 532 and 534, which show a tire sideslip angle as a function of time for an ESC system with DFF control and a base ESC system, respectively. As is shown in FIGS. 5B and 5D, respectively, the roll angle and tire sideslip angle are reduced for the ESC system with DFF control.

Figure 6A:
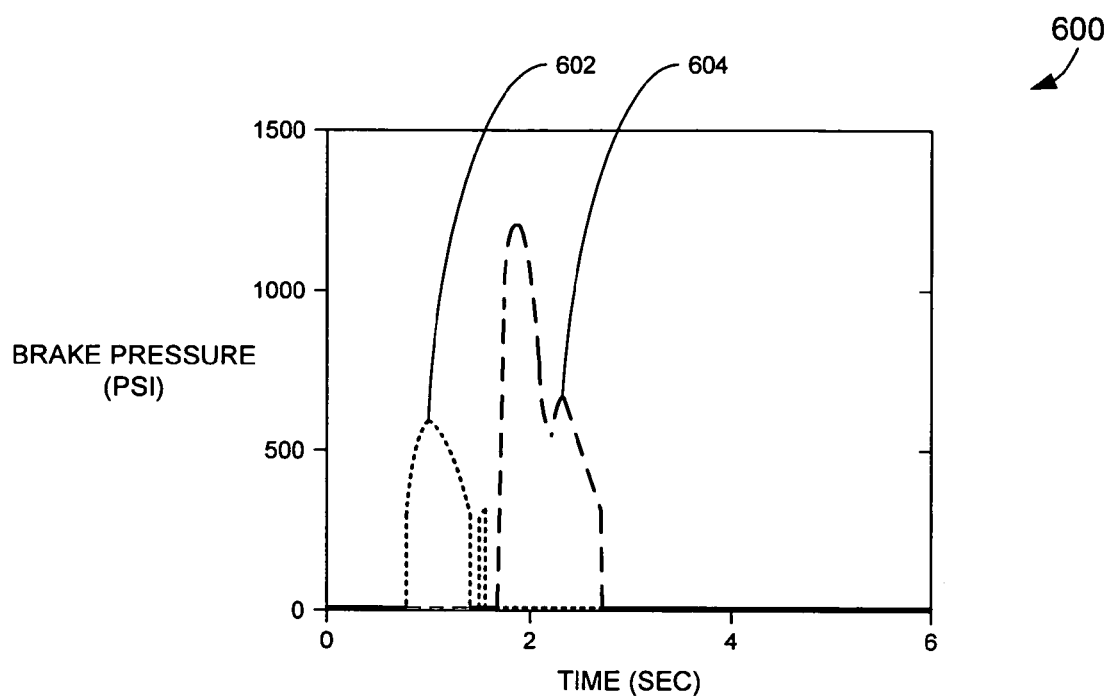
FIG. 6A is a graph that includes curves that plot a brake pressure over time for an ESC system with DFF control, according to FIG. 3, and a base ESC system.
Figure 6B:
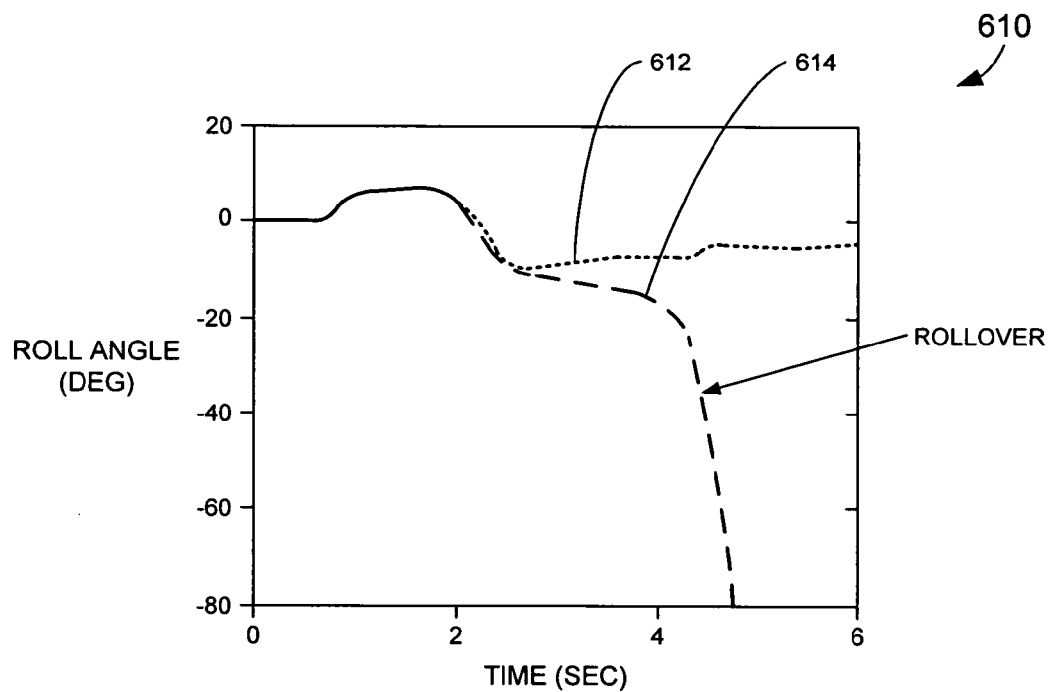
FIG. 6B is a graph that includes curves that plot a rollover angle as a function of time for an ESC system with DFF control, according to FIGS. 4A–4B, and a base ESC system.
Figure 6C:
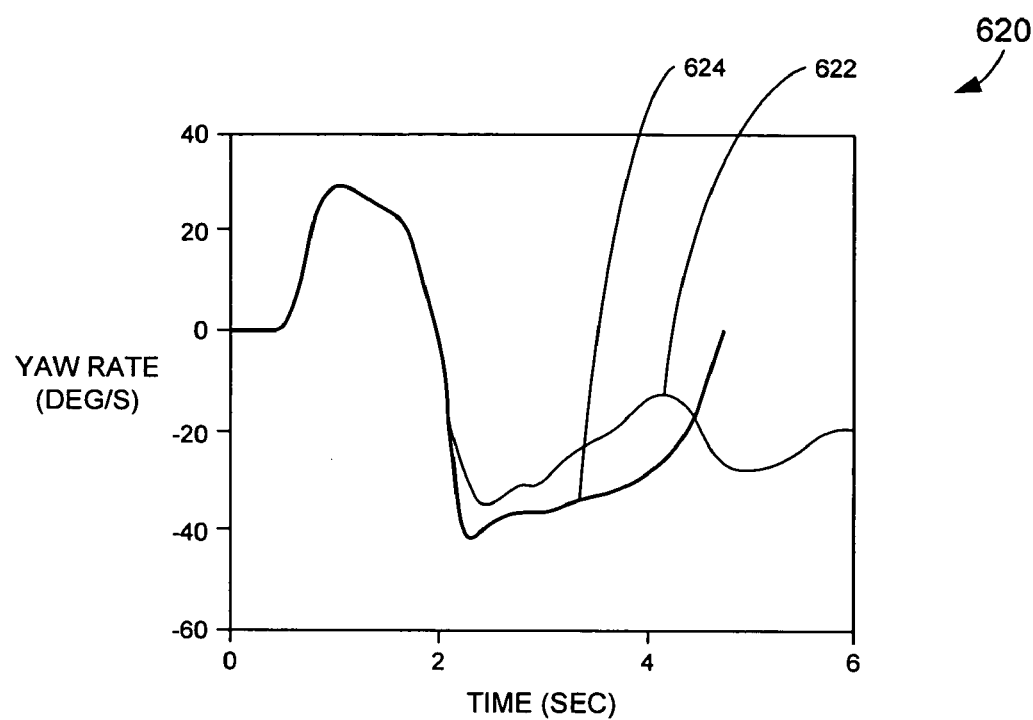
FIG. 6C is a graph that includes curves that plot yaw rate as a function of time for an ESC system with DFF control, according to FIGS. 4A–4B, and a base ESC system.
Figure 6D:
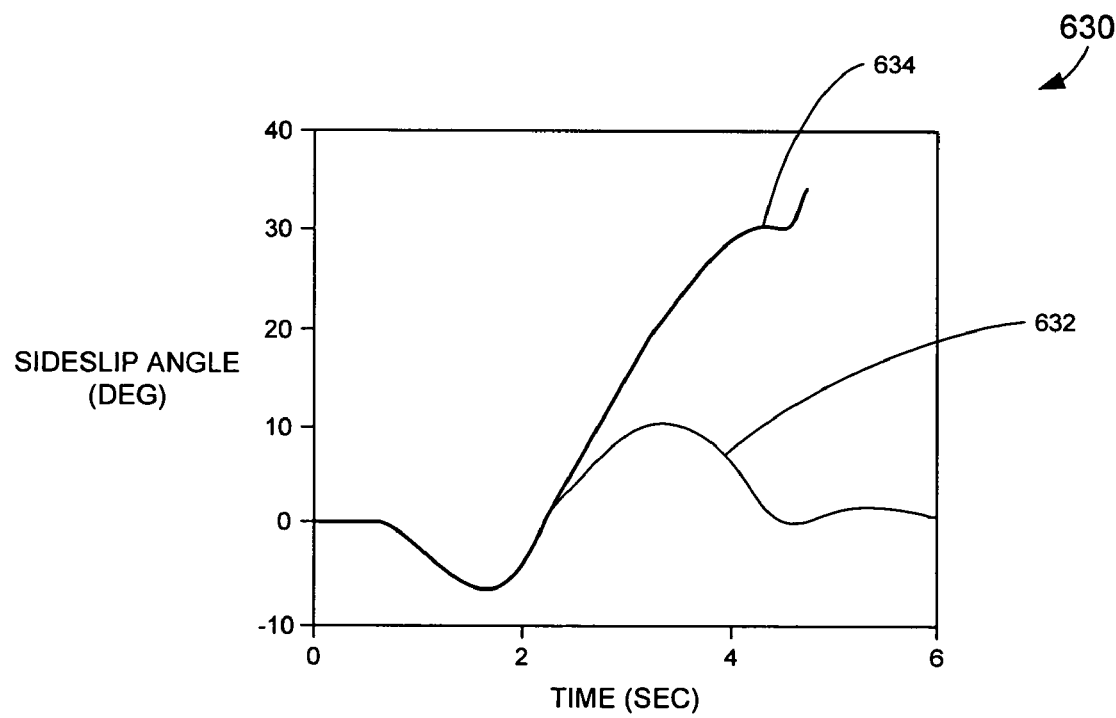
FIG. 6D is a graph that includes curves that plot a tire sideslip angle as a function of time for an ESC system with DFF control, according to FIGS. 4A–4B, and a base ESC system.

FIGS. 6A–6D correspond to simulation curves for the vehicle utilized to provide the results of FIGS. 5A–5D, with the addition of a 200 kilogram payload applied on a top roof of the vehicle. With reference to FIG. 6A, a graph 600 includes curves 602 and 604, which illustrate a brake pressure referenced to time for an ESC system with DFF control and a base ESC system, respectively. As is shown in FIG. 6B, a graph 610 includes curves 612 and 614, which depict a roll angle as a function of time for an ESC system with DFF control and a base ESC system, respectively. As shown in FIG. 6B, an ESC system implementing a dynamic feedforward (DFF) control, according to the present invention, averts excessive roll motion, which would occur with the base ESC model. FIG. 6C depicts a graph 620 that includes curves 622 and 624 that plot yaw rate as a function of time for the ESC system with DFF and a base ESC system, respectively. FIG. 6D depicts a graph 630 that plots a tire sideslip angle as a function of time and includes curves 632 and 634, which correspond to an ESC system with DFF and a base ESC system, respectively.

According to another embodiment of the present invention, a control system is designed to manage yaw-plane motion, while also comprehending and managing roll motion. The control system advantageously accounts for both yaw-plane and roll motion and, thus, avoids coordination problems. As maneuver-induced roll motion is a function of yaw-plane motion, it is possible to reduce maneuver-induced roll motion by properly shaping the yaw-plane motion. Proper shaping of the yaw-plane motion may include increasing yaw damping and/or decreasing a yaw gain, or simply reducing the magnitude of desired yaw rate under various conditions, to avoid excitation of roll dynamics. According to one embodiment of the present invention, the roll motion is predicted, based upon the severity of steering inputs, and not based upon measured vehicle response provided by a roll rate sensor or lateral acceleration sensor.

According to the present invention, braking is controlled to generate a required yaw moment, via differential braking, to properly shape yaw-plane motion of the vehicle and to limit the roll motion of the vehicle. In general, a control system, constructed according to this embodiment of the present invention, is based upon a reference model control approach that provides a reference model control structure that may be utilized for both a feedforward configuration and a feedback configuration. In this embodiment, the reference model generates a desired yaw rate (using steering angle and speed) and may utilize the yaw rate in a feedback loop. As implemented, roll motion prediction logic decides when to dynamically adjust the reference model, to shape the reference model output, i.e., the desired yaw response, to prevent excessive roll motion excitation. It should be appreciated that excessive roll motion may be indicated when a combination of steering angle and steering rate is large for a given speed. It should also be appreciated that other motor vehicle conditions may also be utilized to predict excessive roll motion. In any case, when excessive roll motion is indicated, the desired yaw response is adjusted. The adjustment is made to limit or slow down, e.g., damp, the yaw motion of the vehicle, so as to reduce the roll motion.

It should be appreciated that a number of techniques may be implemented to provide the desired adjustment. One possibility is to generate two values of desired yaw rate, e.g., the value normally used, $YR_{desnorm}$, and the value that changes more slowly in response to the steering input, $YR_{desslow}$, and then calculate the final, actually used, value as a weighted sum of the two above values. That is:

$$YR_{des} = (1-w)*YR_{desnorm} + w*YR_{desslow}$$

where w is a weighting constant, which varies from 0 to 1. The weight is selected in such a way that during normal operation w=0 and the desired yaw rate is equal to the normally used value, i.e., $YR_{des}=YR_{desnorm}$. The weight increases when the large roll motion is predicted. The normal value of the desired yaw rate can be determined primarily from steering angle and vehicle speed, as has been done in ESC systems and is known to those skilled in the art. When w=1, the desired value of yaw rate is equal to the slow value, $YR_{des}=YR_{desslow}$, and the desired value is between normal and slow when 0<w<1. The slow value of desired yaw rate, $YR_{desslow}$, can be obtained for example by passing the desired normal value, $YR_{desnorm}$, through a low pass filter with a static gain of 1, or less than 1 if reduction in magnitude of desired yaw rate is required. The low pass filter may have a form a0/(s+a1) where s is the Laplace operand, a0 and a1 are constants. If a0=a1, the static gain of the filter may be set equal to 1. If a0<a1, the gain may be set less than 1.

As explained above, the value of weight w is equal to zero during normal driving, and it increases continuously to 1 when large roll angle is predicted. In general, large roll angle is predicted when the steering angle and steering rate are large for given speed. An example calculation of the weigh w is illustrated below. First, in the process of calculating the normal desired yaw rate, $YR_{desnorm}$, a steady-state value of desired yaw rate, $YR_{dss}$, is calculated as a function of front steering angle $\delta_F$ and vehicle speed $v_x$. If it is not available, the steady-state value can be computed as:

$$YR_{dss} = \frac{v_x \delta_F}{L + K_u v_x^2}$$

where L is vehicle wheelbase and $K_u$ understeer gradient. The product of steady-state desired yaw rate and speed represents the steady-state desired lateral acceleration, which may be considered a predicted value of actual lateral acceleration. Next, a proportional and derivative (PD) term of the product of $YR_{dss}$ and vehicle speed is calculated as follows:

$$A_{ydPD}=YR_{dss}*v_x+\epsilon*d(YR_{dss}*v_s)/dt$$

where $\epsilon$ is a positive constant, for example 0.4. Subsequently, the weight, w, may be determined as a function of magnitude of $A_{ydPD}$ as follows:

$$w=sat_{0,1}[(|A_{ydPD}|-C_1)/C_2]$$

where $sat_{0,1}$ is a saturation function, which limits the value of operand from 0 to 1 and $C_1$ and $C_2$ are constant values, for example, $C_1=12$ m/s$^2$ and $C_2=10$ m/s$^2$. It is seen that during normal driving, when $A_{ydPD}<C_1$, w=0, and in extremely severe maneuvers, when $A_{ydPD}>C_1+C_2$, then w=1. The rate of change of the weight w is then limited when w is decreasing to a specific value, for example 0.5 at 1 second.

Other ways of adjusting (generally by limiting the rate of change and magnitude of the desired yaw rate) may be used, as can be readily contemplated by those skilled in art. After the desired yaw rate is determined, the control of vehicle yaw motion can be accomplished in the same manner as in ESC systems. This aspect is well known to those skilled in art.

Figure 7A:
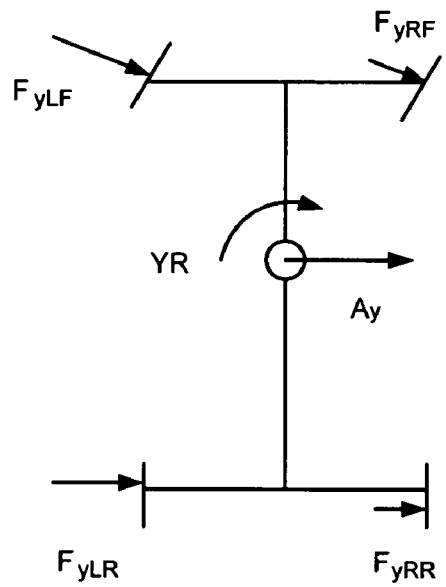
FIGS. 7A–7B are schematics of a yaw-plane and roll motion, respectively, for a motor vehicle.
Figure 7B:
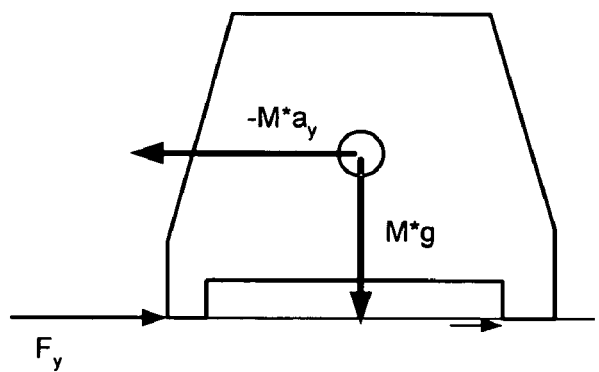

With reference to FIG. 7A, it should be appreciated that by controlling vehicle yaw-plane motion, excessive maneuver-induced roll motion can be avoided. As is shown, turning the front wheels of a motor vehicle to the right causes lateral forces $F_{yLF}$, $F_{yRF}$, $F_{yLR}$ and $F_{yRR}$ to act on the front and rear tires, produces a yaw rate YR and induces a lateral acceleration $A_y$ on the vehicle. With reference to FIG. 7B, it should be appreciated that roll motion may be induced by rapidly changing lateral forces $F_y$, which excite the roll mode. According to the present invention, yaw-plane motion is controlled such that excessive maneuver-induced roll motion is avoided.

Figure 8:
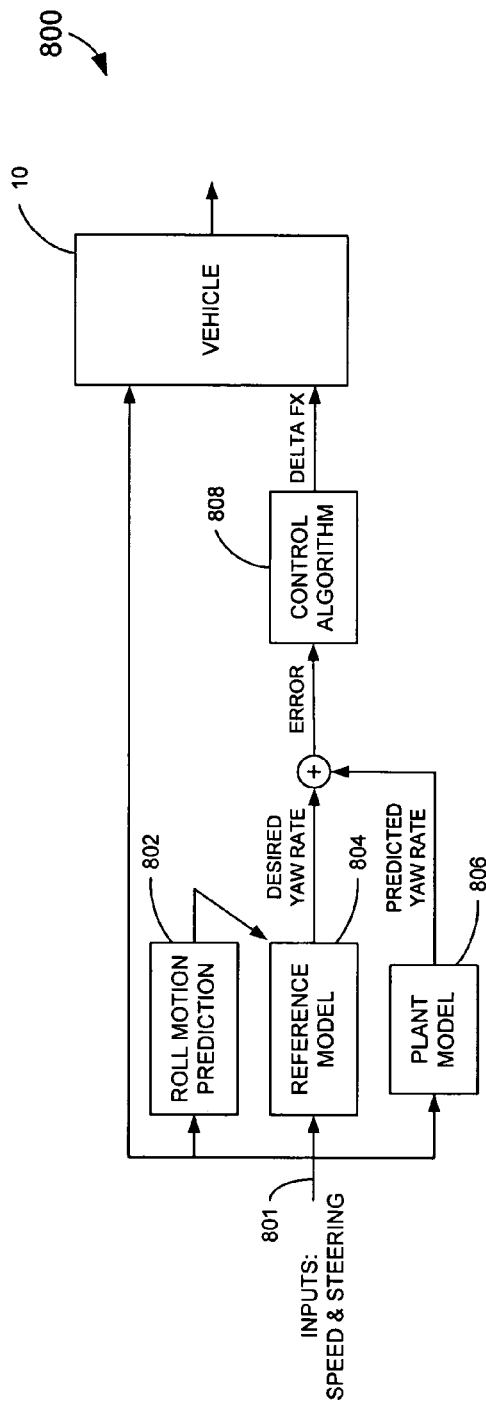
FIG. 8 is a block diagram of a control structure implementing feedforward control, according to one embodiment of the present invention.

FIG. 8 depicts an exemplary feedforward control structure 800 that receives speed and steering inputs 801. The inputs 801 are applied to an excessive roll motion prediction model 802, a reference model 804 and a plant model 806. The reference model 804 calculates a desired yaw rate and, when excessive roll motion is possible, the desired yaw rate is adjusted to limit and/or slow down, i.e., damp, the vehicle's yaw-plane motion. The desired yaw rate is then compared to a predicted yaw rate, provided by the plant model 806, to form an error term, which is provided to an input of a control algorithm 808 that, in response thereto, generates a differential brake force command (Delta Fx), which is provided to a brake subsystem of the vehicle.

Figure 9:
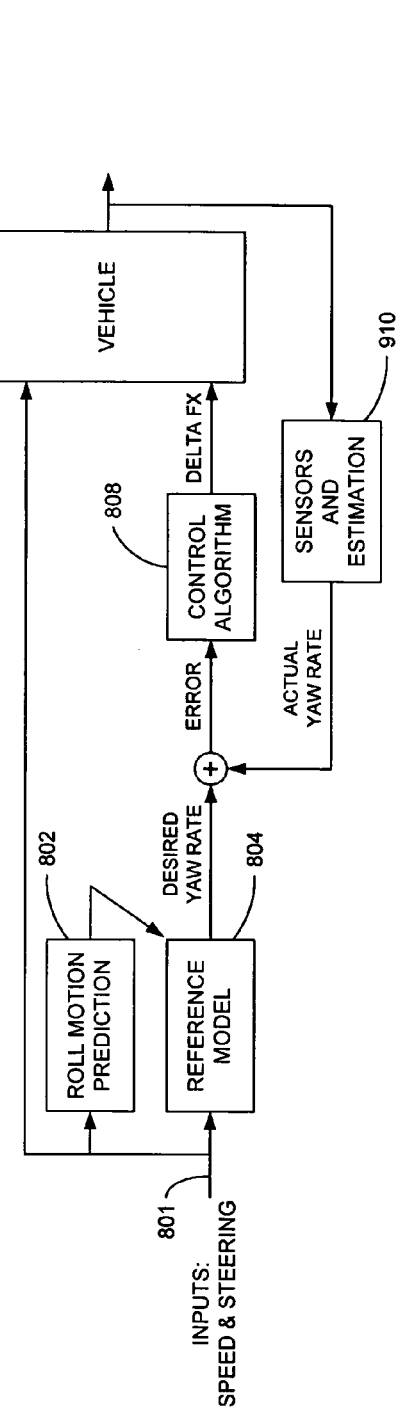
FIG. 9 is a block diagram of a control structure implementing feedforward control of roll mode, according to another embodiment of the present invention.

With reference to FIG. 9, another exemplary feedback control structure 900 is depicted that is similar to the structure 800, with the exception that the plant model 806 has been replaced with sensors 910 that provide a measurement or an estimation of an actual yaw rate. Thus, in the system 900, the actual yaw rate is provided from a sensor instead of being predicted. This modification tends to improve robustness to variations. Thus, by using steering angle and speed, lateral acceleration and its rate of change may be predicted. According to this embodiment, a linear combination of lateral acceleration and its rate of change is used to predict excessive roll motion. When the linear combination is above a threshold, the reference model is gradually modified.

According to the present invention, the rate of change may also be reduced when the linear combination is decreasing in order to prevent jerky control and early exit from the control routine. In general, during excessive roll motion, the reference model, which is generating the desired yaw rate, is modified by increasing a damping ratio in a dynamic second order filter of the reference model, or reducing the rate of change by other means, or by calculating a desired reduction in yaw rate and subtracting this value from the original desired yaw rate value.

Figure 10A:
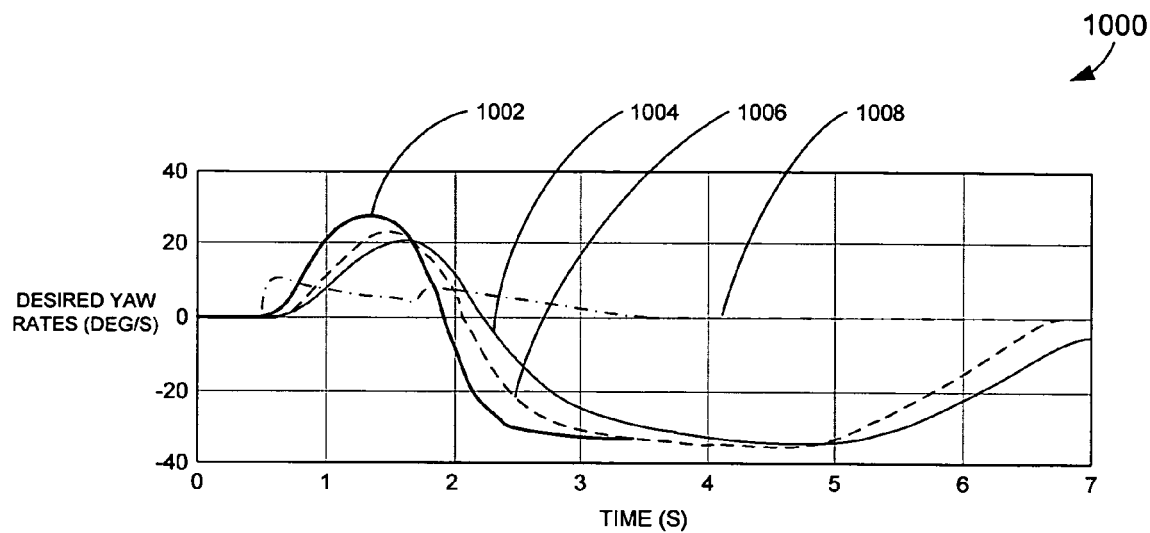
FIG. 10A is a performance graph for a motor vehicle in a fishhook maneuver that includes response curves with different desired yaw rates.
Figure 10B:
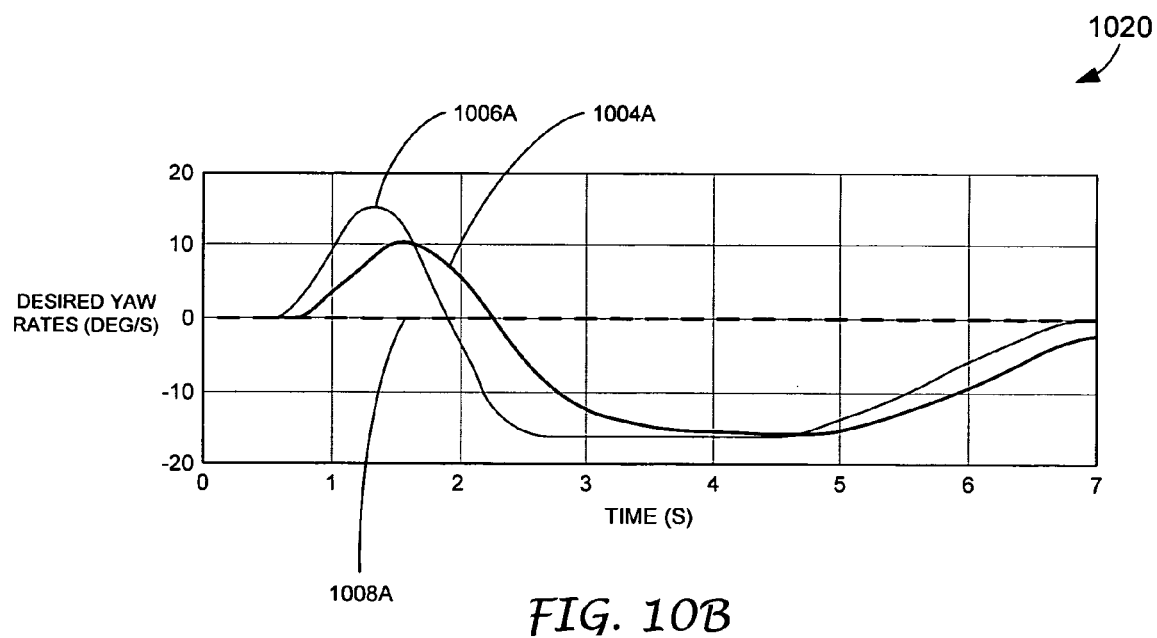
FIG. 10B is a performance graph for a motor vehicle in another fishhook maneuver that includes response curves with different desired yaw rates.

With reference to FIG. 10A, a graph 1000 is depicted that includes a plurality of desired yaw rates for a motor vehicle in a fishhook maneuver at 45 mph, with a steering angle amplitude of 325 degrees. A curve 1002 represents a desired normal yaw rate, a curve 1004 represents a desired slow yaw rate, a curve 1006 represents a desired weighted yaw rate and a curve 1008 represents the weight w multiplied by 10. With reference to FIG. 10B, a graph 1020 depicts a plurality of curves 1004A, 1006A and 1008A, for a motor vehicle in a fishhook maneuver at 45 mph, with a steering angle amplitude of 110 degrees. The curve 1004A corresponds to a desired slow yaw rate, the curve 1006A corresponds to a desired weighted yaw rate, which is identical to the desired normal yaw rate, and the curve 1008A corresponds to the weight w multiplied by 10, which is zero throughout the maneuver. It is seen that in the less severe maneuver, the algorithm does not change the desired yaw rate, which remains identical to the normal desired yaw rate.

Figure 11A:
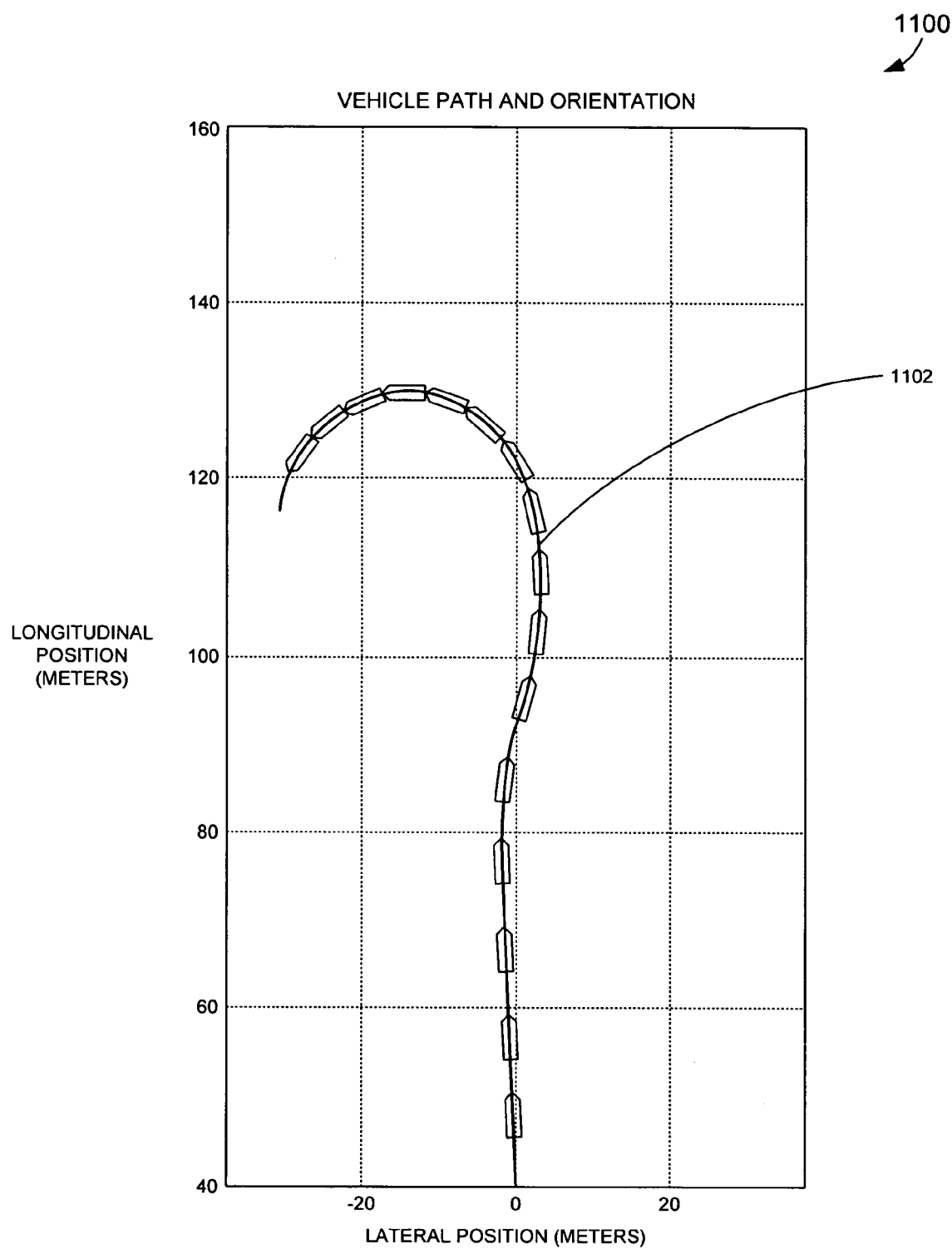
FIGS. 11A–11D are performance graphs for a motor vehicle in a fishhook maneuver without feedforward control.
Figure 11B:
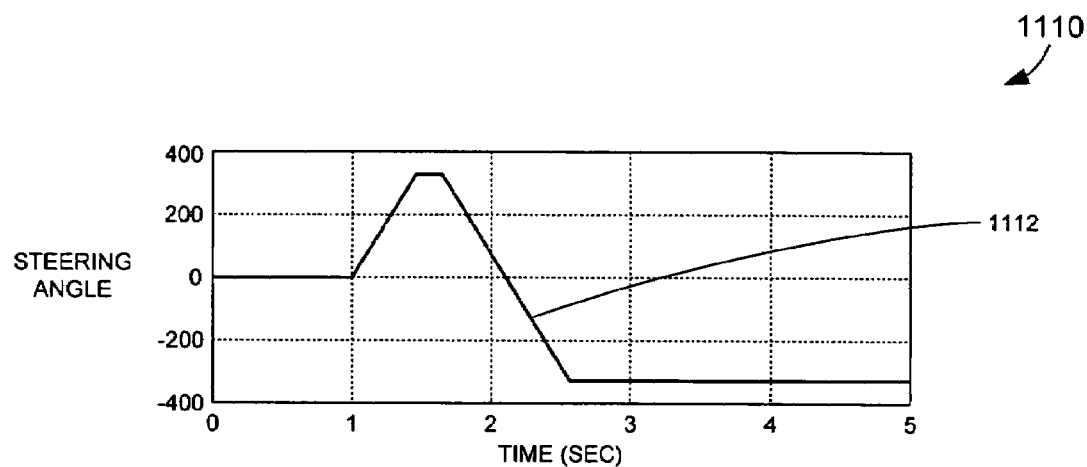
Figure 11C:
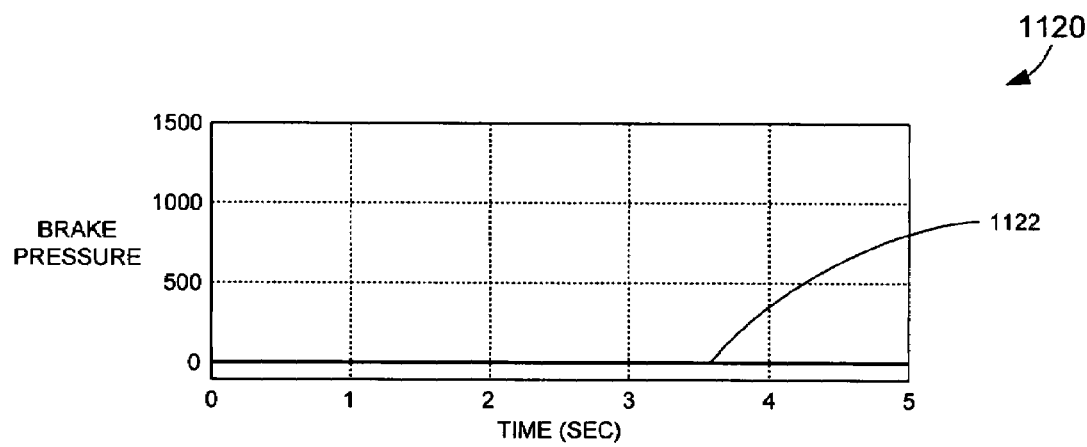
Figure 11D:
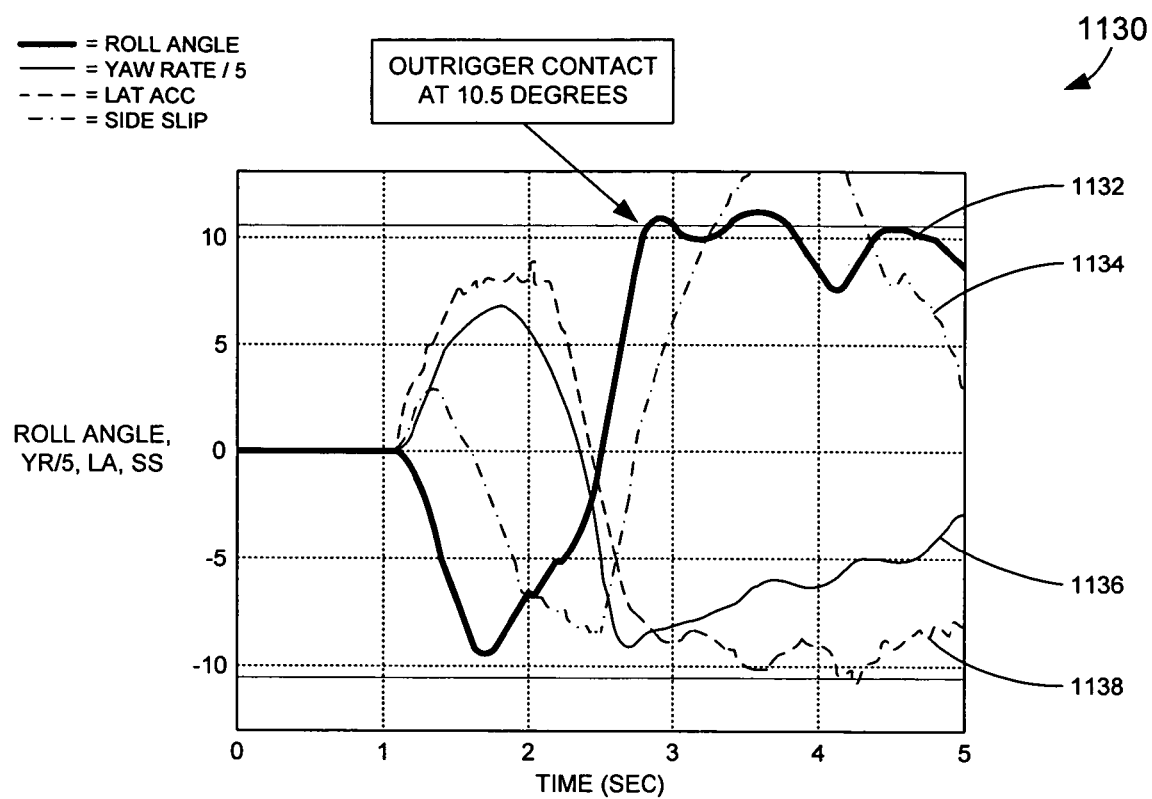

FIGS. 11A–11D correspond to test data for a motor vehicle in a fishhook maneuver at 65 KPH without feedforward control. FIG. 11A depicts a graph 1100 having a curve 1102 that plots a lateral position of the motor vehicle as a function of the longitudinal position, in the performance of a fishhook maneuver. FIG. 11B is a graph 1110 that includes a curve 1112 that shows the position of the steering angle as a function of time. FIG. 11C is a graph 1120 that includes a curve 1122 that shows a motor vehicle brake pressure as a function of time. FIG. 11D is a graph 1130 that includes a plurality of curves 1132, 1134, 1136 and 1138, which depict roll angle, tire sideslip, yaw rate/5 and lateral acceleration of the motor vehicle, respectively, as a function of time.

Figure 12A:
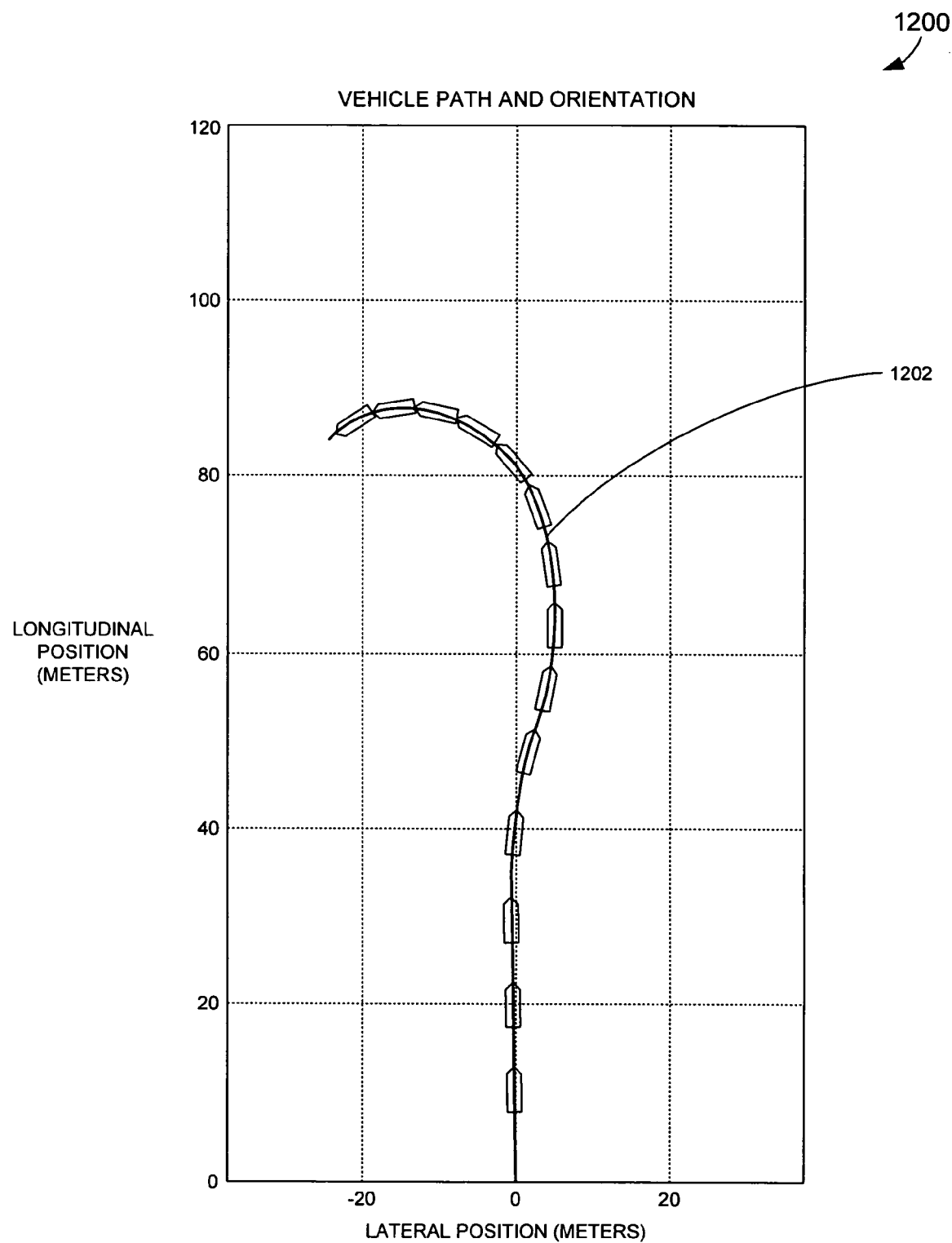
FIGS. 12A–12D are performance graphs for a motor vehicle in a fishhook maneuver with feedforward control, according to the control structure of FIG. 8.
Figure 12B:
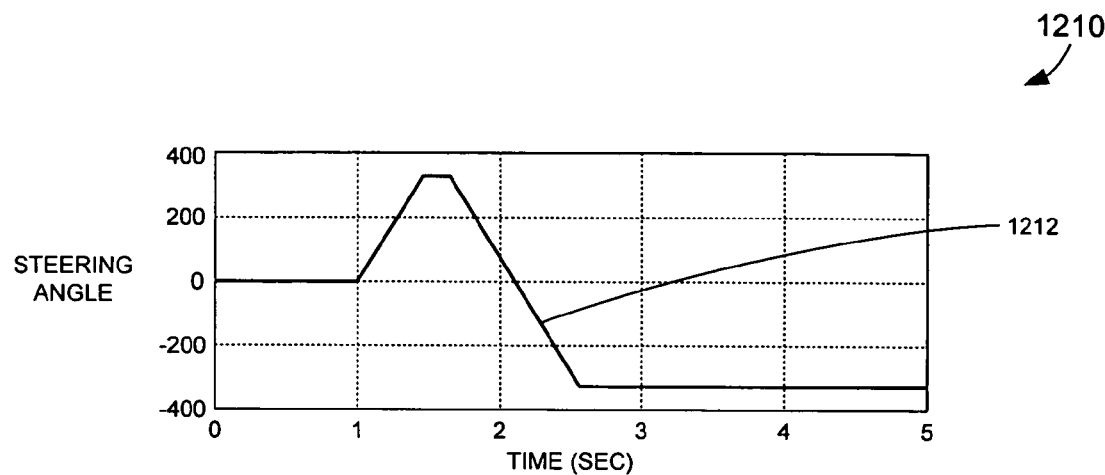
Figure 12C:
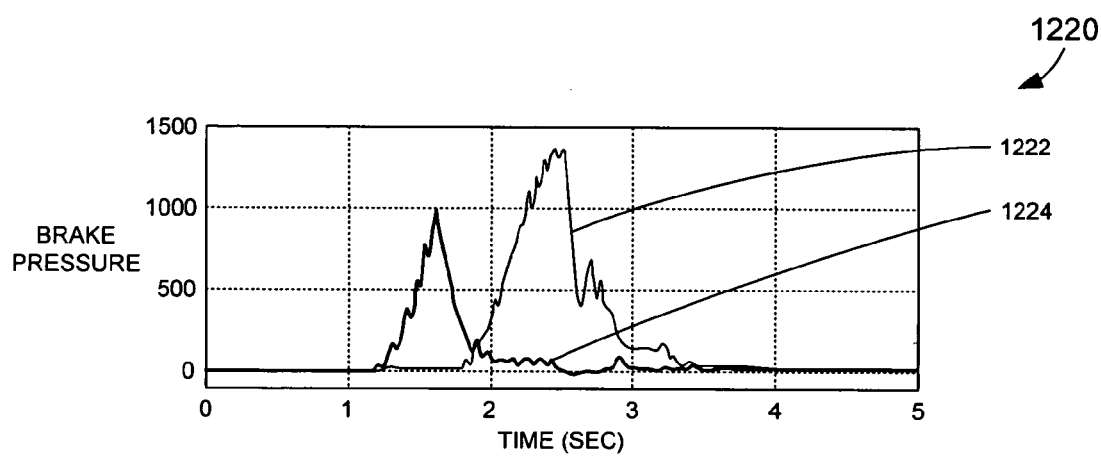
Figure 12D:
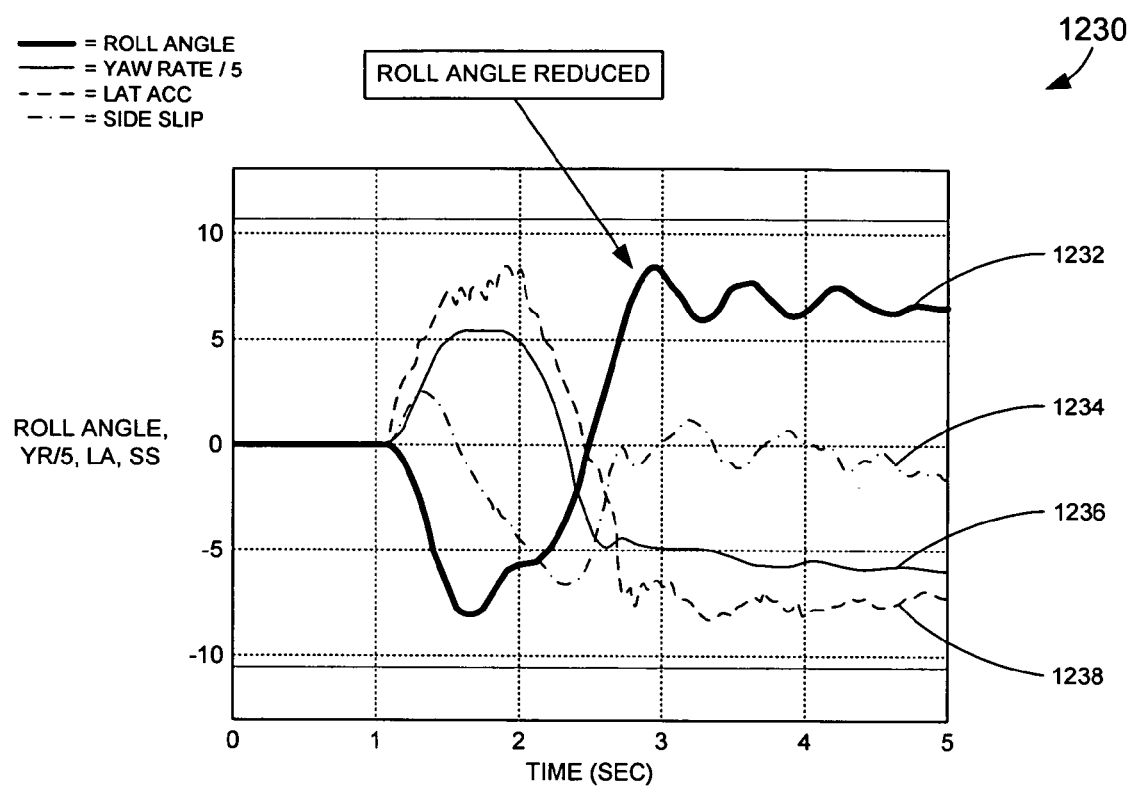

FIGS. 12A–12D correspond to test data for a motor vehicle in a fishhook maneuver at 65 KPH with feedforward control, according to FIG. 8. FIG. 12A depicts a graph 1200 having a curve 1202 that plots a lateral position of the motor vehicle as a function of the longitudinal position, in the performance of a fishhook maneuver. FIG. 12B is a graph 1210 that includes a curve 1212 that shows the position of the steering angle as a function of time. FIG. 12C is a graph 1220 that includes curves 1222 and 1224 that shows the motor vehicle brake pressure for the right and left front wheels, respectively, as a function of time. FIG. 12D is a graph 1230 that includes a plurality of curves 1232, 1234, 1236 and 1238, which depict roll angle, tire sideslip, yaw rate/5 and lateral acceleration of the motor vehicle, respectively, as a function of time. Contrasting FIG. 11D to FIG. 12D, it is apparent that the control structure 800 of FIG. 8 has controlled the motor vehicle to cause a reduction in the roll angle of the motor vehicle.

Figure 13A:
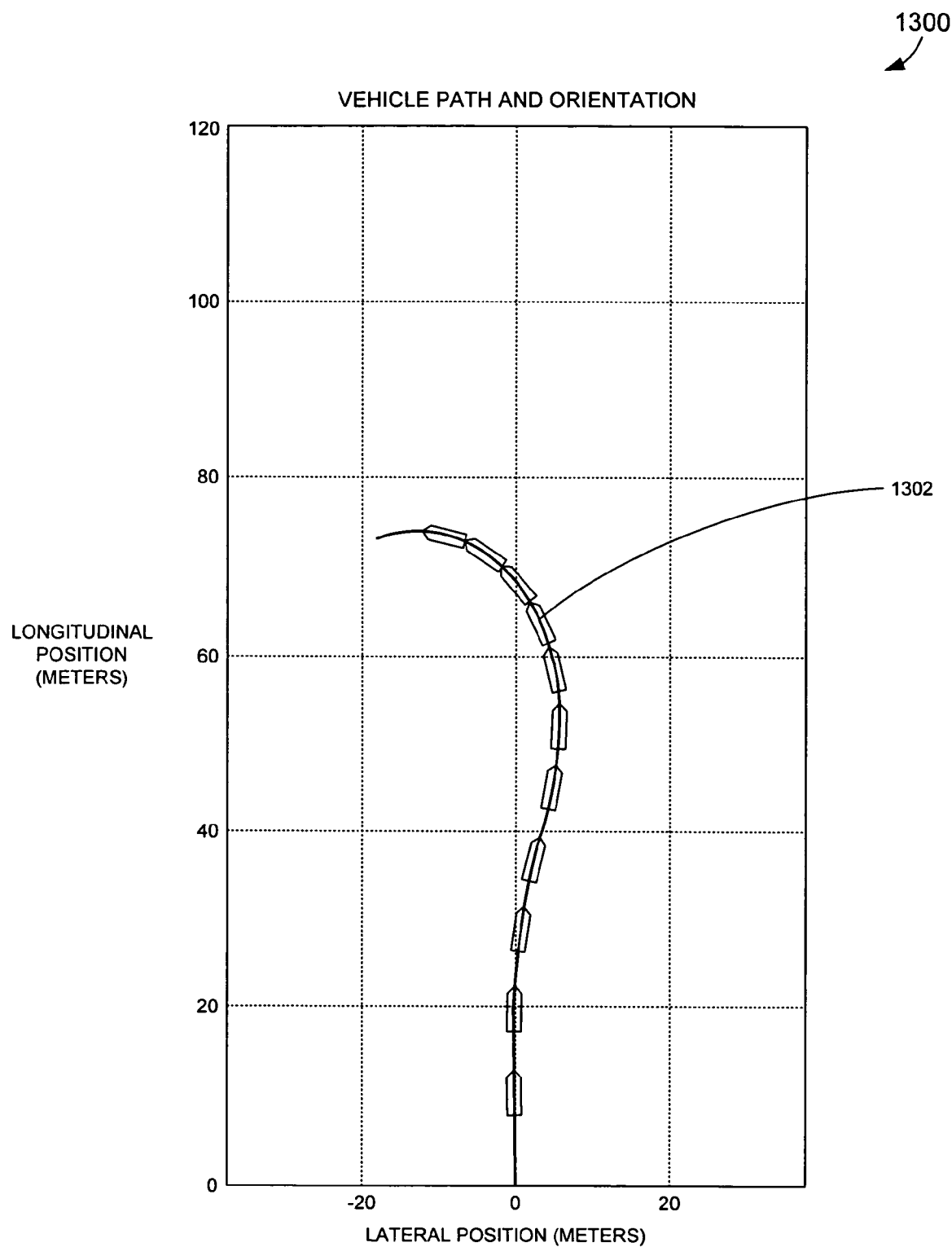
FIGS. 13A–13D are performance graphs for a motor vehicle in a fishhook maneuver with feedforward control of roll mode, according to the control structure of FIG. 9.
Figure 13B:
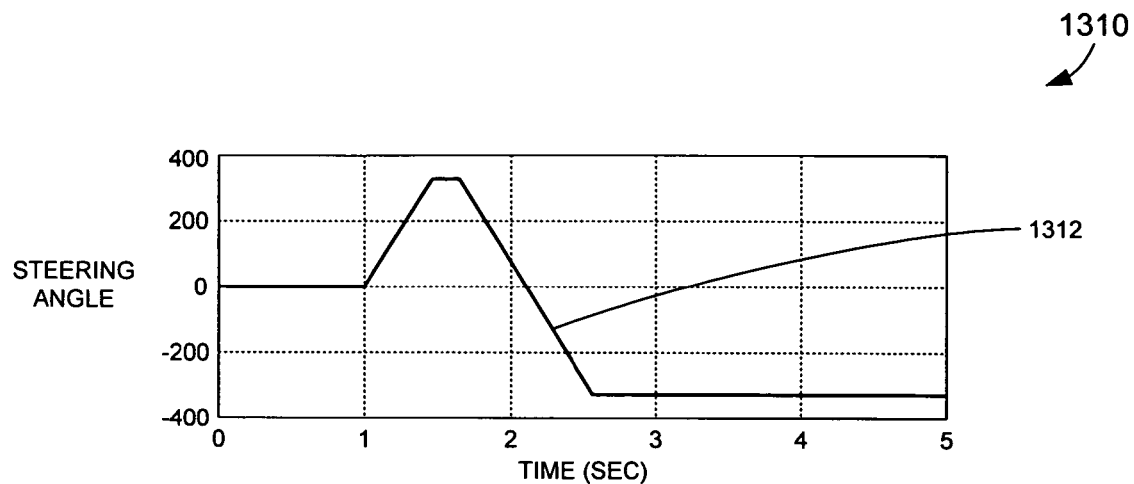
Figure 13C:
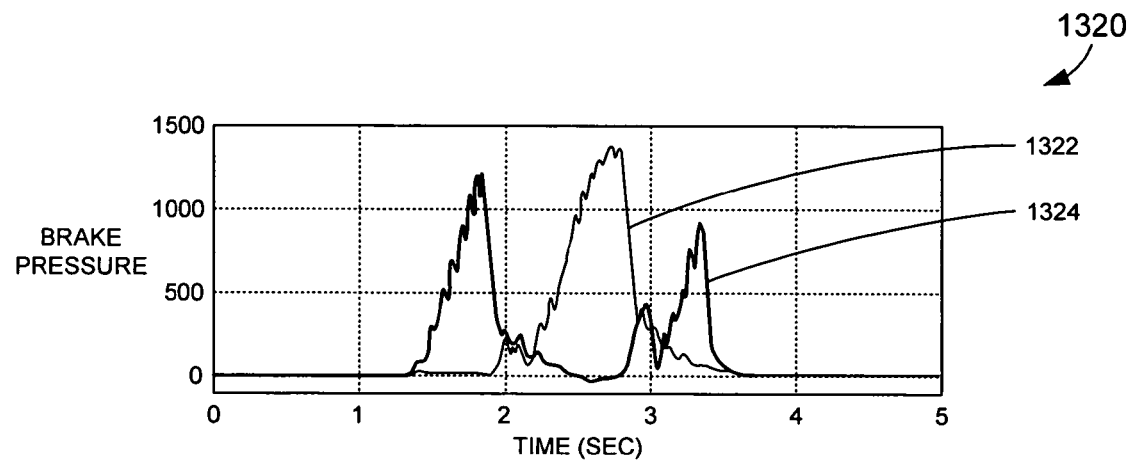
Figure 13D:
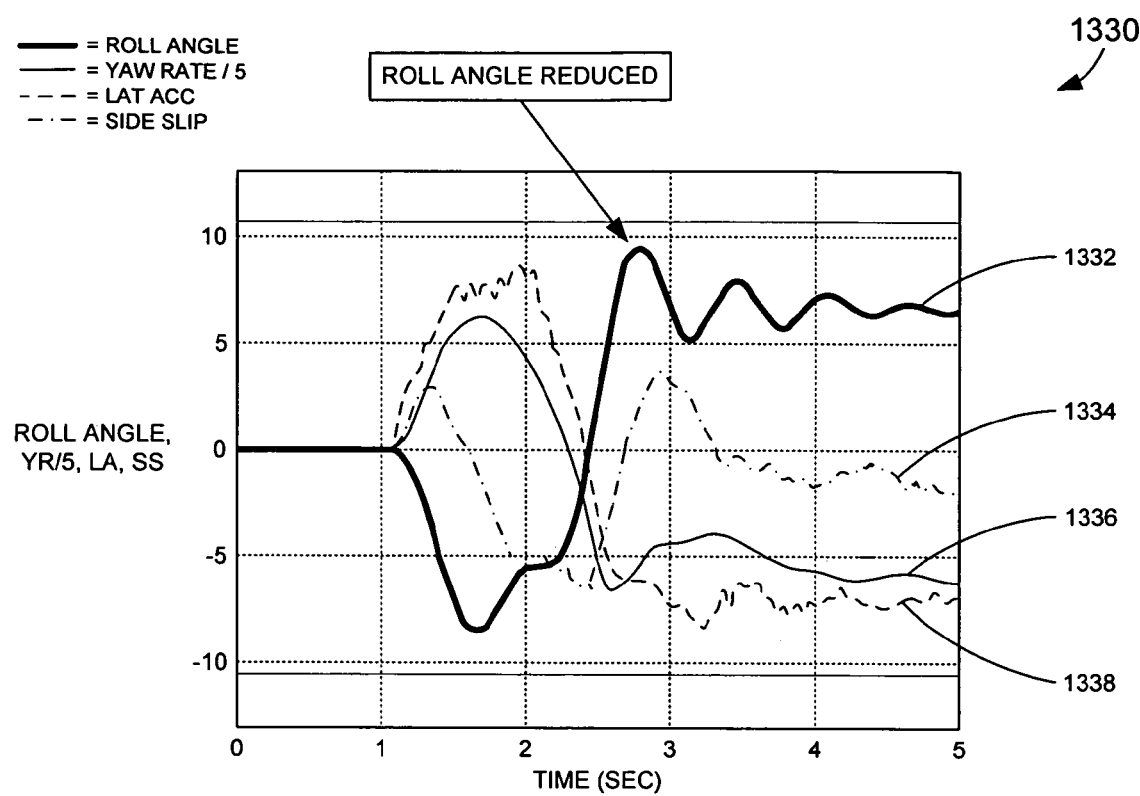

FIGS. 13A–13D correspond to test data for a motor vehicle in a fishhook maneuver with feedforward control, configured according to the control structure 900 of FIG. 9. FIG. 13A depicts a graph 1300 having a curve 1302 that plots a lateral position of the motor vehicle as a function of the longitudinal position, in the performance of a fishhook maneuver. FIG. 13B is a graph 1310 that includes a curve 1312 that shows the position of the steering angle as a function of time. FIG. 13C is a graph 1320 that includes curves 1322 and 1324 that show the motor vehicle brake pressure for the right and left front wheels, respectively, as a function of time. FIG. 13D is a graph 1330 that includes a plurality of curves 1332, 1334, 1336 and 1338, which depict roll angle, tire sideslip, yaw rate/5 and lateral acceleration of the motor vehicle, respectively, as a function of time. As with the control structure 800, implementation of the control structure 900 results in a roll angle reduction.

Accordingly, feedforward control structures have been described herein that advantageously manage both yaw-plane and roll motion of a motor vehicle.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A dynamic feedforward (DFF) electronic stability control (ESC) system for a motor vehicle, comprising:
    at least one sensor for providing a driver input;
    a control unit implementing a dynamic reference model that provides a desired behavior based upon the driver input, the control unit implementing a feedforward control that determines an ESC differential brake force based upon the desired behavior, wherein the control unit converts the ESC differential brake force into a delta velocity (DVLR) command; and
    an electronic stability control (ESC) actuator coupled to the control unit and receiving the DVLR command, wherein the ESC actuator controls a motor vehicle subsystem responsive to the DVLR command to provide a desired correction to an associated motor vehicle.

2. The system of claim 1, wherein the driver input includes a steering angle and a vehicle speed of the associated motor vehicle.

3. The system of claim 1, wherein the reference model models one of a desired motor vehicle yaw rate and a desired motor vehicle roll angle.

4. The system of claim 1, wherein parameters of the reference model are modified to achieve a desired motor vehicle characteristic.

5. The system of claim 4, wherein the desired motor vehicle characteristic is one of a motor vehicle yaw rate and a motor vehicle roll angle.

6. The system of claim 4, wherein the reference model is represented by a transfer function that has one zero and two poles.

7. The system of claim 4, wherein the reference model is represented by a transfer function that has two zeroes and four poles.

8. The system of claim 4, wherein the reference model is represented by a transfer function that has three zeroes and four poles.

9. The system of claim 1, wherein the ESC differential brake force is represented by a transfer function that has at least three zeroes and three poles.

10. A control system for a motor vehicle that coordinates yaw-plane motion and roll motion of the motor vehicle, the system comprising:
    at least one sensor for providing a plurality of driver inputs, wherein the driver inputs include a motor vehicle steering angle and a motor vehicle speed;
    a control unit implementing a reference model that provides a desired yaw rate based upon the driver inputs, the control unit implementing a roll motion prediction model which predicts when roll motion of the vehicle may be severely excited by yaw-plane motion, the control unit implementing a plant model algorithm that provides a predicted yaw rate based upon the driver inputs, the control unit modifying the desired yaw rate when roll motion excitation exceeds a desired level, the control unit determining an error term based upon the desired yaw rate and the predicted yaw rate and providing a delta velocity (DVLR) command based on the error term to manage the roll motion excitation; and
    an electronic stability control (ESC) actuator coupled to the control unit and receiving the DVLR command, wherein the ESC actuator controls a motor vehicle brake subsystem responsive to the DVLR command to provide a desired correction to the motor vehicle.

11. The system of claim 10, wherein parameters of the reference model are modified to adjust the desired yaw rate to reduce yaw-plane motion of the motor vehicle.

12. The system of claim 10, wherein a lateral acceleration and rate of change in the lateral acceleration are predicted from the steering angle and speed, and wherein a linear combination of the lateral acceleration and the rate of change in the lateral acceleration are used to predict excessive roll motion.

13. The system of claim 12, wherein parameters of the reference model are modified to adjust the desired yaw rate to reduce yaw-plane motion of the motor vehicle when the predicted roll motion is above a threshold value.

14. The system of claim 13, wherein a rate of change in the parameters is reduced when the linear combination is decreasing.

15. The system of claim 10, wherein the reference model is modified by at least one of increasing a damping ratio of a second order filter, gain adjustment and natural frequency adjustment.

16. A control system for a motor vehicle that coordinates yaw-plane motion and roll motion of the motor vehicle, the system comprising:
    at least one sensor for providing a plurality of driver inputs, wherein the driver inputs include a motor vehicle steering angle and a motor vehicle speed, the at least one sensor also providing an actual yaw rate;
    a control unit implementing a reference model that receives the steering angle and the speed and provides a desired yaw rate, the control unit implementing a roll motion prediction model which predicts when roll motion of the vehicle may be severely excited by yaw-plane motion, the control unit modifying the desired yaw rate when roll motion excitation exceeds a desired level, the control unit determining an error term based upon the desired yaw rate and the actual yaw rate and providing a delta velocity (DVLR) command based on the error term to manage the roll motion excitation; and
    an electronic stability control (ESC) actuator coupled to the control unit and receiving the DVLR command, wherein the ESC actuator controls a vehicle brake subsystem responsive to the DVLR command to provide a desired correction to an associated motor vehicle.

17. The system of claim 16, wherein parameters of the reference model are modified to adjust the desired yaw rate to reduce a yaw-plane motion of the motor vehicle.

18. The system of claim 16, wherein a lateral acceleration and rate of change in the lateral acceleration are predicted from the steering angle and speed, and wherein a linear combination of the lateral acceleration and the rate of change in the lateral acceleration are used to predict excessive roll motion.

19. The system of claim 18, wherein parameters of the reference model are modified to adjust the desired yaw rate to reduce yaw-plane motion of the motor vehicle when the predicted roll motion is above a threshold value.

20. The system of claim 19, wherein a rate of change in the parameters is reduced when the linear combination is decreasing.

21. The system of claim 16, wherein the reference model is modified by at least one of increasing a damping ratio of a second order filter, gain adjustment and natural frequency adjustment.

* * * * *